US011392968B2

(12) United States Patent
Nielsen et al.

(10) Patent No.: US 11,392,968 B2
(45) Date of Patent: Jul. 19, 2022

(54) SYSTEM AND METHOD OF ANALYZING SOCIAL MEDIA TO PREDICT THE CHURN PROPENSITY OF AN INDIVIDUAL OR COMMUNITY OF CUSTOMERS

(71) Applicant: THINKCX TECHNOLOGIES, INC., Langley (CA)

(72) Inventors: Aaron David Nielsen, Langley (CA); Qiao Pang, Surrey (CA); Ebrahim Bagheri, Toronto (CA); Mohammad-Amin Jashki, Toronto (CA); Fattane Zarrinkalam, Toronto (CA); Alireza Vazifedoost, Toronto (CA)

(73) Assignee: THINKCX TECHNOLOGIES, INC., Langley (CA)

( * ) Notice: Subject to any disclaimer, the term of this patent is extended or adjusted under 35 U.S.C. 154(b) by 0 days.

(21) Appl. No.: 16/565,207

(22) Filed: Sep. 9, 2019

(65) Prior Publication Data
US 2020/0242640 A1    Jul. 30, 2020

Related U.S. Application Data

(63) Continuation of application No. 15/052,831, filed on Feb. 24, 2016, now abandoned.

(60) Provisional application No. 62/120,221, filed on Feb. 24, 2015.

(51) Int. Cl.
| G06Q 30/02 | (2012.01) |
| G06Q 50/00 | (2012.01) |
| G06F 16/335 | (2019.01) |
| G06F 16/9535 | (2019.01) |

(52) U.S. Cl.
CPC ....... *G06Q 30/0202* (2013.01); *G06F 16/337* (2019.01); *G06F 16/9535* (2019.01); *G06Q 50/01* (2013.01)

(58) Field of Classification Search
CPC ............ G06Q 10/00–50/00; G06F 1/00–40/00
USPC ............................................... 705/7.11–7.42
See application file for complete search history.

(56) References Cited

U.S. PATENT DOCUMENTS

| 8,630,892 B2* | 1/2014 | Bhalla | G06Q 30/02 |
| | | | 705/7.31 |
| 8,843,431 B2* | 9/2014 | Anderson | G06Q 50/00 |
| | | | 706/52 |
| 9,189,737 B2* | 11/2015 | Javarappa | G06N 5/02 |
| 9,262,517 B2* | 2/2016 | Feng | G06Q 30/02 |
| 9,710,470 B2* | 7/2017 | Appel | G06F 16/24578 |
| 2007/0156673 A1* | 7/2007 | Maga | G06Q 30/02 |
| | | | 707/999.005 |
| 2009/0292583 A1* | 11/2009 | Eilam | G06Q 40/02 |
| | | | 705/7.31 |
| 2012/0047219 A1* | 2/2012 | Feng | G06F 16/2465 |
| | | | 707/661 |

(Continued)

*Primary Examiner* — Alan S Miller
(74) *Attorney, Agent, or Firm* — P G Scott Born; Foster Garvey PC

(57) ABSTRACT

A system and method for mining social media signals and cues i) created by a user (for example, a customer) and/or ii) to which the user is exposed (the "data"), and for processing that data as it relates to a service (including a fee or subscription-based service), in order to predict the user's predisposition or likelihood to either leave the subscription or the service or reduce his/her engagement with the subscription or the service.

15 Claims, 13 Drawing Sheets

(56) References Cited

U.S. PATENT DOCUMENTS

| | | | | |
|---|---|---|---|---|
| 2012/0053990 | A1* | 3/2012 | Pereg | G06Q 40/08 |
| | | | | 705/7.31 |
| 2013/0054306 | A1* | 2/2013 | Bhalla | G06Q 30/02 |
| | | | | 705/7.31 |
| 2013/0185245 | A1* | 7/2013 | Anderson | G06Q 50/00 |
| | | | | 706/52 |
| 2013/0204682 | A1* | 8/2013 | Stachiw | G06Q 30/02 |
| | | | | 705/14.14 |
| 2013/0218882 | A1* | 8/2013 | McConnell | G06F 16/24524 |
| | | | | 707/E17.014 |
| 2014/0119522 | A1* | 5/2014 | Phadke | H04M 15/44 |
| | | | | 379/133 |
| 2014/0244664 | A1* | 8/2014 | Verma | G06Q 30/0251 |
| | | | | 707/749 |
| 2014/0297580 | A1* | 10/2014 | Javarappa | H04L 12/00 |
| | | | | 706/52 |
| 2015/0074122 | A1* | 3/2015 | Appel | G06F 16/9535 |
| | | | | 707/749 |
| 2016/0253688 | A1* | 9/2016 | Nielsen | G06F 16/337 |
| | | | | 705/7.31 |

* cited by examiner

Customer Retention
Dashboard 700

ThinkCX ☒ Aaron Nielsen ▽

| Dashboard | Alerts | Lookup | Reports | Settings | Want to Add a Team Member? |

Alerts

| Status | | Start Date | End Date | Alert Type | Alert Code | Flagged |
|---|---|---|---|---|---|---|
| Open ≫ | | 02/12/2015 ☐ ≫ | 02/12/2015 ☐ ≫ | Churn ≫ | All ≫ | All |

| Status | Date | Name | ID | Type | Code | Insight | Flag |
|---|---|---|---|---|---|---|---|
| (Open) | 2015/03/13 | Tom Smithson | 324 | Churn | CO03 | This is where the Tweet of the reason would be inserted | |
| (Closed) | 2015/03/13 | Gary Roberts | 324 | Upsell | UO05 | This is where the Tweet of the reason would be inserted | ⚑ |
| (Closed) | 2015/03/13 | Hannah Jones | 324 | Churn | CO13 | This is where the Tweet of the reason would be inserted | |
| (Closed) | 2015/03/13 | Igor Smouer | 324 | Churn | CO09 | This is where the Tweet of the reason would be inserted | ⚑ |

ThinkCX

☒ Aaron Nielsen ▽

| Dashboard | Alerts | Lookup | Reports | Settings | Want to Add a Team Member? |

Twitter or Email | Name | Company | Phone | Location

[Search]
[Reset]

Profiles ☒

☒

Tom Smithson
Wayne, PA 📍

Afbn@ Twitter
Qfk Pricipal Solution
Architect Tech geek,
Travel, periods fan, Valserva Univ
Former Ad Intruder

☒

Tom Smithson
@Facebook

True Star Financial,
Financial industry, 900-200
employees, founded in 1942
🐦 f %

ALERTS AND INSIGHTS

◁ ☐ ▷

| Status | Date | Name | ID | Type | Code | Insight | Flag |
|---|---|---|---|---|---|---|---|
| (Open) | 2015/03/13 | Tom Smithson | 324 | Churn | CO03 | This is where the Tweet of the reason would be inserted | |
| (Closed) | 2015/03/13 | Gary Roberts | 324 | Upsell | UO05 | This is where the Tweet of the reason would be inserted | |
| (Closed) | 2015/03/13 | Hannah Jones | 324 | Churn | CO13 | This is where the Tweet of the reason would be inserted | 🚩 |
| (Closed) | 2015/03/13 | Igor Smouer | 324 | Churn | CO09 | This is where the Tweet of the reason would be inserted | 🚩 |

TEAM COMMENTS

◁ ☐ ▷ [Add]

| Date | User | Insight |
|---|---|---|
| 2015/03/13 | Sergey Sitchkin | This is where the comment would be inserted |
| 2015/03/13 | Tiger Woods | This is where the comment would be inserted |

*Fig. 8A*

CUSTOMER RECORD WATCHING

Addresses
2013/01-    332 McMull Dr, Wayne PA    ⌃
2015/05    19087-2026
1985/01-   72342 Gator Street, Wayne    ⌃
2013/01    PA    19087-2026

Phone Numbers
604-232-1234    Comcast Phone    ⌃

Email Addresses
Isemtheoz99@gmail.com

Additional Info may be available on Facebook

Also Associated with
Igor Smithson, Jennifer Reynolds

Wayne, PA    4:01 PM Tues

Notable Relationships    ⌃ ⌃ ⌃

Igor Smithson

Linda Robinson

Heather Smithson

---

SOCIAL CONVERSATIONS    ☑ Company    ☑ Competitor (6)    ☑ Custom (3)    ☐ Other (3200)

⊠  Tom Smithson @tomsmithson99    4 hours ago

[ Company ]

Probably need to use a scrollbar to "secure" link of too many events

---

NOTABLE CONNECTIONS

⊠  Comcast Cares

Insert blurb from their Twitter description

[ Company ]    [ Helpsaver ]    [ Following ]

*Fig. 8B*

General Architecture of Data Pipeline

Life Event Participation in Churn Prediction

Life Event Prediction Component

SYSTEM AND METHOD OF ANALYZING SOCIAL MEDIA TO PREDICT THE CHURN PROPENSITY OF AN INDIVIDUAL OR COMMUNITY OF CUSTOMERS

. PRIORITY CLAIM

This application is a continuation of U.S. application Ser. No. 15/052,831, filed Feb. 24, 2016, which claims priority from U.S. Provisional Application No. 62/120,221, filed Feb. 24, 2015, both of which are hereby incorporated by reference in their entireties as if fully set forth herein.

FIELD OF THE INVENTION

This invention is related to the automatic prediction of customer churn in service and subscription based businesses by using intelligent and real-time analysis of customer's social media profiles, engagement and community.

BACKGROUND OF THE INVENTION

The popularity of the subscription-based business model has increased dramatically over the past 25 years, as more and more service providers opt for the predictability and cash flow benefits of monthly recurring revenue. Companies using subscription or recurring billing models understand the potentially lucrative lifetime value of each customer they sign up, especially if the customer will commit to longer-term contracts, and so they are willing to invest considerable amounts in new customer acquisition. When customers prematurely leave a service provider, the recovery of the acquisition costs can become a real problem. And so, service providers devote substantial time and resources into customer retention, by staffing "save teams" and offering loyalty incentives such as price reductions, plan upgrades, and free devices in order to maintain existing customers. However, the rate at which customers cancel or opt for a competitor, called the "churn rate", has really not abated that much, despite the efforts.

Two contemporary market attributes are contributing to an increasing focus on solving the problem of consumer churn. First, many of the new technology industries born during the past 30 years or so are entering a period of relative maturity and near-total market penetration. For example, the days of mass new customer acquisition in the cable television, broadband internet, mobile phone, retail banking, and insurance segments are all but over, and now players in these markets have to rely on signing up their competitors' customers in order to replace their own churning customers. Secondly, with the boom in online connectivity, search engines, mass digital media, and online consumer communities, individuals are always only a mouse click away from being lured away by a bigger, better deal. Trading existing customers for new customers is a losing proposition, and so service providers are investing heavily in churn solutions in order to retain their more profitable existing customers.

The financial rewards that can be gained by a mere one or two percent drop in annual churn rate are enormous for a large service provider. Yet, to this point, churn reduction remains an area of significant opportunity, because the current customer retention solutions deployed by service providers can generally be characterized as reactive, and driven by internal data. They are reactive in the sense that most of the efforts made to "save" or retain the customer are undertaken only after the customer communicates their intent to cancel their subscription, at which point it is unlikely any incentive will change their mind. And even when some of the more innovative service providers deploy more predictive churn indication technologies and processes, they are almost exclusively driven by data collected from their own management systems and customer databases, and pay little or no attention to consumer data available in the external environment, and specifically, the social web.

There is therefore, a great opportunity for a technical innovation in customer churn—one that is predictive and proactive, and that brings rich sources of social and web data and analysis into the mix. Such an invention would complement rather than displace current retention solutions, and would enable service providers to treat churn with preventative measures. It would also move retention efforts further upstream into the customer's experience, leading to higher save rates and a reduction in the cost of incentives.

The purpose of the present invention is therefore to help service providers attack churn in a much more predictive and proactive manner, which in turn will generate a financial return for the service provider through higher retention rates, lower loyalty incentive costs, and a superior customer experience.

SUMMARY OF THE INVENTION

It is an object of the present invention to mine social media signals and cues i) created by a user and/or ii) to which the user is exposed (the "data"), and to process that data as it relates to a service or a subscription-based service, in order to predict the user's predisposition to either leave the subscription or the service or reduce his/her engagement with the subscription or the service.

It is an object of the invention to provide methods, systems and computer program products for reducing churn and/or improving retention of customers of a service or a subscription, using social media signals and cues i) created by a user and/or ii) to which the user is exposed.

The present invention generally relates to a computer-implemented method to characterize social influence and to predict behavior of a user, said user being part of a social network, and more particularly to a computer-implemented method which comprises creating a dynamically updatable social influence profile of the user, predicting future behavior of the user based on influence given by the user and received by the user from his social circles, and thereafter predicting the user's predisposition to either leave a subscription or a service or reduce his/her engagement with a subscription or a service.

The method and system of the invention depends upon the characterization of influence among social media users, and in assigning feature vector similar cohorts to a user in order to predict future behavior of that user, using the proprietary "churn" analysis of the invention.

It is believed that customer save rates can be increased by increasing the sophistication and variety of ways to attempt to save the customers from subscription or service cancellation. The tools and techniques discussed herein relate to tailoring computer-based customer saving procedures to a particular customer who may not have yet explicitly signaled to the company/provider the desire to cancel or reduce a service or a subscription. The invention "catches" the user at least one step before such conveyance.

The method and system of the present invention have substantial benefits for service and subscription-based businesses, which lose substantial revenue each year due to customer churn. To mitigate these losses, companies have implemented customer retention programs; however, these programs are limited in their effectiveness. There are several reasons for this, including but not limited to:

Existing churn prediction programs are limited to analyzing internally available business data such as service usage patterns.

Companies lack accurate individual-level insights about their customers' personalities and in particular their general propensity to change service providers.

Determining a customer's social community is a critical part of churn prediction as a customer's network can greatly impact their predisposition to switch. Existing programs attempt to assess this via call patterns but fail to include the richness of social media interactions.

Existing social monitoring solutions are designed to capture explicit brand mentions and hence fail to capture non-explicit customer churn signals such as engagement with competitors, general service dissatisfaction, and community influence.

It is very difficult to cost effectively associate social profiles and signals to an individual's customer record which is necessary for using social insights in a churn prediction solution.

The present invention provides, in one aspect, a method for the early prediction of communities of customers who are likely to cancel their subscriptions or services. This is accomplished by analyzing a customer's social media profile (SMP).

The present invention provides, in another aspect, a computerized system for locating the social profiles for customers, collecting their SMP, analyzing the information, and delivering the results to businesses so they can proactively make efforts to retain their customers before they decide to cancel their products.

The present invention provides, in another aspect, a method for finding individuals with low degrees of loyalty to their service providers. These predictions are achieved by analyzing the historical social media content of each individual and looking for features indicating customer estrangement to service providers.

The present method and system is able to accurately and proactively identify the churn risk of an individual customer or community of customers. As a result, this method provides the following benefits:

Companies can proactively identify customers that are at a high risk of churning and hence implement an early retention strategy that will be more effective and less costly than waiting for them to cancel Companies can modify their retention offers based on the customer's overall propensity to change providers. For example, a loyal customer that rarely switches providers can be offered a smaller retention package.

Companies can examine the impact of social communities and influence to improve their retention strategies. For example, a company could shift the sentiment of a customer that is a high influencer in their community.

Companies can advance their existing churn prediction systems with signals from the customer's SMP.

The end result of implementing a churn prediction and management program as outlined herein is to develop a better understanding of the causes of churn and of the characteristics of customers who will likely churn in the future and to generate a target list of the most likely future churners. By attaining a better understanding of the reasons for churn, and identifying the most likely churners, the business/enterprise may implement a much more efficient and much more effective customer retention program.

The present invention provides, in one aspect, a computer implemented method of collecting/mining data relating to social media influence around a customer, and analyzing said data to predict a customer's predisposition to either leave a subscription or a service or reduce his/her engagement with a subscription or a service which comprises: a) receiving a plurality of social media inputs associated with the customer; b) determining a churn probability for the customer; and c) performing an action based on the determined churn probability.

The present invention provides, in another aspect a computer-implemented method to characterize social influence and to predict behavior of a user, said user being part of a social network which comprises a) creating a dynamically updatable social influence profile of the user, b) predicting future behavior of the user based on influence given by user and received by the user from his social circles, and thereafter c) predicting the user's predisposition to either leave a subscription or a service or reduce his/her engagement with a subscription or a service.

The present invention provides, in another aspect a computer implemented method of collecting/mining data relating to social media influence around a customer, and analyzing said data to predict a customer's predisposition to either leave a subscription or a service or reduce his/her engagement with a subscription or a service comprises:

a) identifying a social media profile of the customer;
b) comparing customer and his social media profile to clusters of customers, based upon similar social media profiles ("cohorts"); and
c) calculating predicted churn behavior of the customer, based upon known churn behavior of cohorts.

The present invention provides, in another aspect a system, comprising: an information module that is configured to identify a user of a service; a probability module that is configured to determine a churn probability for the user of the service; and an action module that is configured to perform an action based on the determined churn probability.

The present invention provides, in another aspect a computer implemented method of designing an efficient customer retention program for managing customer churn among customers of a business, the customer retention program including an analysis of the causes of customer churn and identifying customers who are most likely to churn in the future, so that appropriate steps may be taken to prevent customers who are likely to churn in the future from churning, the method comprising:

a) identifying a social media profile of the customer;
b) comparing customer and his social media profile to clusters of customers, based upon similar social media profiles ("cohorts");
c) calculating predicted churn behavior of the customer, based upon known churn behavior of cohorts; and
d) performing an action based on the predicted churn behavior of the customer.

The present invention provides, in another aspect a computer-implementable method for predicting and delivery of churn signals for customers that are at risk of terminating their subscription and/or service to the customer retention units at the provider company, wherein the churn predictions are generated by analysis of full social media profiles of customers.

The present invention provides, in another aspect, a machine implemented system that predicts and delivers churn signals to customer relationship management (CRM)

software of service-based or subscription businesses for customers who are at risk of cancelling their services which comprises:
  a) a processor system that lives on the CRM software as a plug in;
  b) a second processor that continuously monitors and processes SMPs of that company's customers to find new churn signals; and
  c) a third processor with live communication between the first and the second processor and which delivers new signals from the first processor to the second as soon as new churn signals are predicted.

The present invention provides, in another aspect, a non-transitory, tangible computer-readable medium storing instructions adapted to be executed by a computer processor to perform a method for generating customer churn prediction, for an entity in need of such prediction, said method comprising the steps of: extracting and receiving, by a churn prediction program executing on the computer processor, a variety of social media inputs; pre-processing the social media inputs to identify relevant social media posts, data trends and social network structures (pre-processed data); extracting and engineering features of the pre-processed data, such features comprising at least one of i) assessed social media postings, ii) assessed life events, iii) assessed engagement with the entity and competitors of said entity iv) assessed trend predisposition of customers to the entity based upon their prior churns, v) assessed one or more communities of customers to the entity and predisposition of the customers to the entity to churn based upon churn risk of the one or more communities; create feature vectors based at least upon i) to v); aggregating feature vectors into a database and creating churn model in the processor (churn model of aggregated features); determining, by the churn prediction program executing on the computer processor, predicted churn behavior of any one customer to the entity based upon, the comparison of at least one feature vector of the any one customer to the churn model of aggregated features.

BRIEF DESCRIPTION OF THE FIGURES

FIG. 7 is a depiction 700 of a console where customer retention agents would view a queue of churn risk signals.

DETAILED DESCRIPTION OF THE INVENTION

Figure 1:
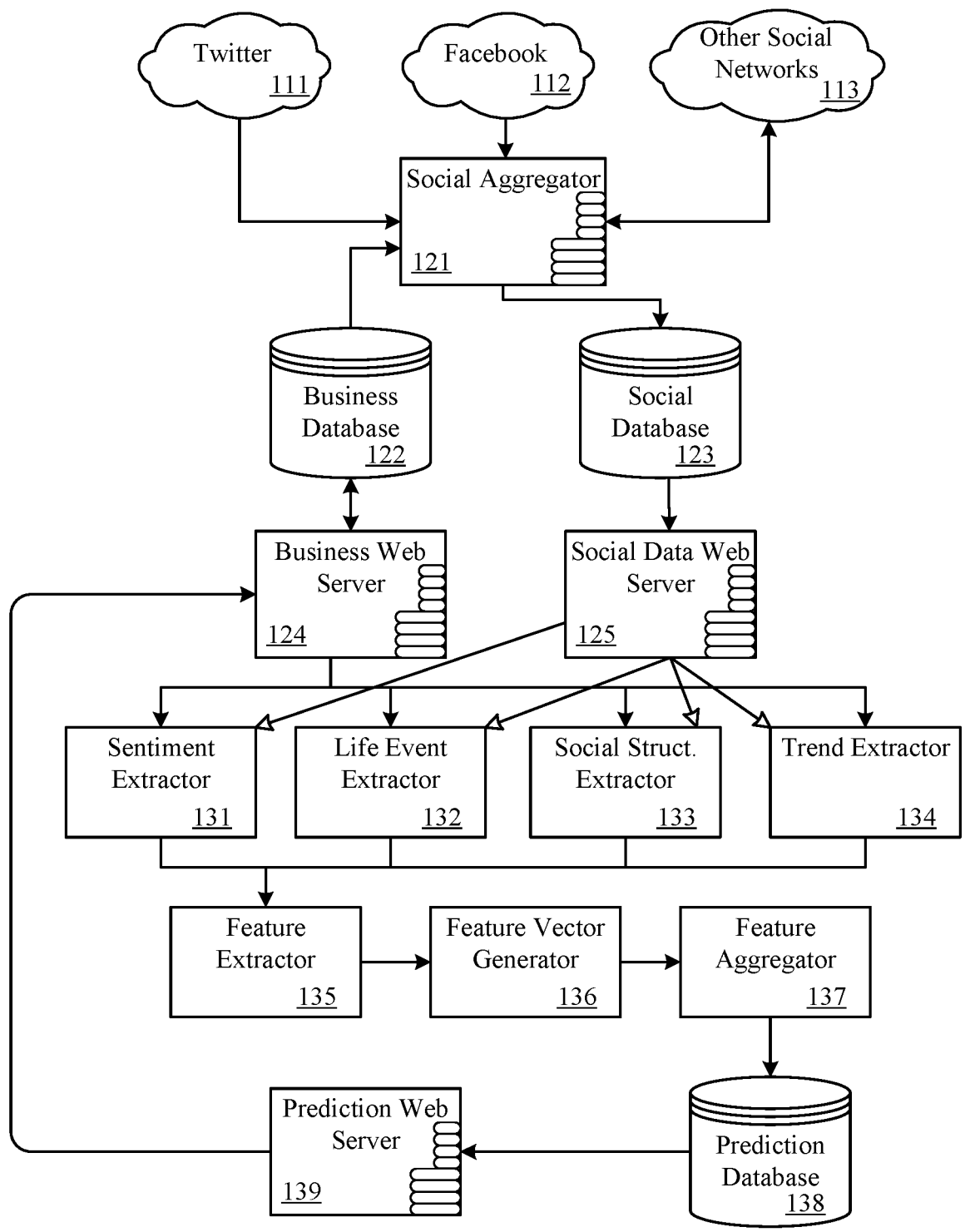
FIG. 1 is a diagram depicting the complete computer system 100 used to identify communities with high likelihood of churn and alert the customer retention departments.

A detailed description of the one or more embodiments of the present invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not necessarily obscured.

Unless specifically stated otherwise, it is appreciated that throughout the description, discussions utilizing terms such as "processing" or "computing" or "calculating" or "determining" or "displaying" or the like, refer to the action of the processes of a data processing system, or similar electronic computing device, that manipulates and transforms data represented as physical (electronic) quantities within the computer system's registers and memories into other data similarly represented as physical quantities within the computer system memories or registers or other such information storage transmission, or display devices.

The algorithms and displays with the applications described herein are not inherently related to any particular computer or other apparatus. Various general-purpose systems may be used with programs in accordance with teachings herein, or it may prove convenient to construct more specialized apparatus to perform the required machine-implemented method operations. The required structure for a variety of these systems will appear from the description below. In addition, embodiments of the present invention are not described with references to any particular programming language. It will be appreciated that a variety of programming languages may be used to implement the teachings of embodiments of the invention as described herein.

An embodiment of the invention may be implemented as a method of as a machine-readable non-transitory storage medium that stores executable instructions that, when executed by a data processing system, causes the system to perform a method. An apparatus, such as a data processing system, can also be an embodiment of the invention. Other features of the present invention will be apparent from the accompanying drawings and from the detailed description which follows.

Terms

The term "invention" and the like mean "the one or more inventions disclosed in this application", unless expressly specified otherwise.

The terms "an aspect", "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

The term "device" and "mobile device" refer herein to any personal digital assistants, Smart phones, other cell phones, tablets and the like.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including", "comprising", and variations thereof mean "including but not limited to", unless expressly specified otherwise.

The terms "a", "an", and "the" mean "one or more", unless expressly specified otherwise.

The term "plurality" means "two or more", unless expressly specified otherwise.

The term "herein" means "in the present application, including anything which may be incorporated by reference, unless expressly specified otherwise.

The term "whereby" is used herein only to precede a clause or other set of words that express only the intended result, objective, or consequence of something that is previously and explicitly recited. Thus, when the term "whereby" is used in a claim, the clause or other words that the term "whereby" modified do not establish specific further limits of the claim or otherwise restricts the meaning or scope of the claim.

The term "e.g." and the like mean "for example", and thus does not limit the term or phrase it explains. For example, in a sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and the like mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and the like mean "that is", and thus limits the term or phrase it explains. For example, in the sentence "the computer sends data (i.e. instructions) over the Internet", the term "i.e." explains that "instructions" are the "data" that the computer sends over the Internet.

The term social media profile (abbreviated to "SMP") includes, but is not limited to, social streams, follows (e.g., likes and follows), community influence, personality types and social media engagement with peers, family members, the company and competitors across social networks such as TWITTER®, FACEBOOK®, LINKEDIN®, INSTA-GRAM®, GOOGLE+®, REDDIT®, YELP® and WORDPRESS®. Within the scope of the invention, analysis is carried out on the processed SMP to intelligently infer the desired communities.

The term "user" may be interchanged with "customer" as varying aspects of the invention are described. For example and in the interest of clarity: a customer of a service or subscription (whose social media behaviors and influences are mined and analyzed in accordance with the present invention) is also a user of at least one social media platform or network. A plurality of feature vectors of the user are identified against which cohorts of the user may be computed in order to predict the likelihood of the user either leaving a subscription or a service (with which he/she is a customer) or reduce his/her engagement with a subscription or a service (with which he/she is a customer).

It is also to be understood that "user" need not necessarily be an individual by a community of users. In other words, using the method and system of the invention, predictions of user service termination or reduction can be determined on a mass scale.

As used herein, "churn" or "churn rate" refers to a number of individuals that leave a group or other collection over a certain period of time, such as a number of customers that leave a subscription-based service. Churn, therefore, is similar to attrition, and may be the opposite of retention. For example, a customer-based service model may succeed when customer churn is low (and retention is high), and may fail when customer churn is high (and retention is low), among other things. However, specifically within the scope of the invention, churn may also refer to a user reducing the type or nature of services from a supplier/company/industry (while not fully leaving the service entirely). In whichever form, churn is considered detrimental to a supplier/company/industry. Industries that rely on subscription-based service models, such as the cable television industry, the cell phone industry, web-based services, and so on, spend a considerable amount of time, money, and effort attempting to identify reasons why their customer churn, in order to provide retention incentives to customers that keep them from ending use of provided services. However, prior to the present invention, their efforts often lack insight or are driven by information received directly from customers or from simple metrics, which may lead to ineffective results and unsuccessful determinations as to why customers are not being retained, among other problems.

Any given numerical range shall include whole and fractions of numbers within the range. For example, the range "1 to 10" shall be interpreted to specifically include whole numbers between 1 and 10 (e.g., 1, 2, 3, 4, . . . , 10) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or machine or distributed across several devices or machines.

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R Section 1.72(b). The title of the present application and headings of the sections provided in the present application are for convenience only, and are not to be taken as limiting the disclosure in any way.

Why Care about Churn?

Consumers typically purchase products or subscribe to services from businesses who they perceive to be offering the best products or services at the lowest price. And while consumers are often loyal to providers and brands they are familiar with, they will surely shift allegiance if they believe they can obtain better products or services or a better price somewhere else. Established ongoing relationships with existing customers can be a significant source of revenue for many businesses, while losing customers to competitors can significantly cut into a company's revenue. Managing this phenomenon, taking active steps to prevent customer "churn" is a high priority for many businesses.

In many cases it is less expensive for a business to retain existing customers than to acquire new ones. For this reason many companies will go to great lengths to maintain their existing customer base. In highly competitive industries it is common for companies to implement elaborate customer loyalty programs or aggressive customer retention programs to prevent or limit churn. Such programs may offer incentives to customers to entice them to continue buying the company's products or services or they may simply provide some personalized contact or message to existing customers to reinforce and strengthen the relationship.

Designing an efficient and effective customer retention program can be difficult, especially when confronted with a large diversified customer base. Companies may not know whether churning is a significant problem or not. And if it is, which customer groups are most likely affected. Furthermore, a company's tolerance threshold for churn may be very low. Customer churn may be considered a problem even though it may only affect a small percentage of the overall customer base. Contacting all customers during a customer retention program is too expensive and inefficient. However, contacting too few customers could result in a failure to contact many customers who are likely to churn and who are the appropriate targets of the customer retention program. Deciding who to contact, represents a significant obstacle to preparing an effective customer retention program.

Despite the critical importance of customer churn, companies have been challenged to accurately and cost effectively predict customers that are at risk of leaving their services or subscriptions. There are several key reasons for this, including but not limited to:

Companies in high churn industries have begun to deploy systems and processes that attempt to predict at-risk customers and communicate proactively with them. They obtain data from their own internal systems, and analyze for patterns and attributes which they can correlate with probable customer outcomes. For example, a wireless network may decide to reach out proactively to customers in an area that has experienced an unusual outage, or a service provider may identify customers placing three or more calls for technical support to be at risk of leaving. However, the fact remains that the great wealth of external, individual, attributable customer preference and sentiment being expressed in real time on social media channels is not yet effectively being added to the mix by companies attempting to identify potential churners.

Greater emphasis is being placed by companies these days on understanding their customers. Marketing teams are introducing "Voice of the Customer" programs designed to elicit feedback and measure the customer's willingness to recommend the product or service, and building detailed psychographic and demographic customer profiles in an attempt to understand the behaviors of customer segments. However, the data and insights generated from these exercises is generalized across groups of customers, and still does not accurately capture the specific personality attributes and attrition behaviors of individual consumers. So while the general data is helpful in defining product specifications and building marketing campaigns, the absence of individual user-level insights prevents companies from taking direct and specific action on individual cases.

When it comes to retention and attrition, the opinions and actions of a customer's network of friends and family can be a highly influential factor. One method that companies are using to gauge that sort of influence is to map the customer's social networks to gain a clearer understanding of the strongest social forces acting upon them. For example, a wireless carrier could analyze a list of frequently called phone numbers and determine who a customer's closest social, family and professional contacts might be. Currently, those analytical processes do not include social media interactions, such as tweet frequency, lists of friends and followers, and message content. However, having access to that social media data would be of tremendous benefit to the carriers' existing efforts, and perhaps even more valuable to other service providers with no access to raw social node data such as phone usage patterns.

Companies that are implementing social media listening or monitoring tools have a large and growing number of options in the marketplace. However, nearly all of the currently-available listening technologies are configured to capture only explicit brand and product name mentions, and filter out all non-explicit messages and activity. Yet, the non-explicit signals are a rich source of valuable insights, provided that the messages and activity can be attributed to specific customers—something that the conventional social listening solutions fail to do. By limiting their analysis to explicit brand mentions, the current solutions miss out on the opportunity to associate specific customers with the more nuanced, but still very revealing messages they post about dissatisfaction, engagement with competitors, and intent to churn.

Any technology that claims to leverage social media profiles and signals to predict churn must possess two important characteristics, namely; attribution and cost-efficiency. Attribution in this context refers to the technology's ability to associate or connect a company's individual customers with their social profiles in such a way that the past and future messages they post are automatically attributed back to that specific customer. Without an attribution component, it is nearly impossible to predict individual churn situations. Further, the methods of obtaining and analyzing social messages can be prohibitively expensive if not done efficiently, and so the technology used to perform these operations must be carefully designed and built with cost efficiencies in mind. Currently available technologies are not able to deliver against these two requirements.

The present invention addresses and resolves the aforementioned challenges and provides a computer-implementation method and system for predicting the customers that are highly likely to cancel or change their service or subscription. With this information, companies can proactively implement early retention strategies that are lower cost and more effective.

One aspect of the present invention relates to the use of a customer's "social media profile" (SMP) to predict whether they are at risk of churning or not. The rise of social media outlets such as TWITTER, FACEBOOK, Blogs, and INSTAGRAM has generated a wealth of publicly available user information. Human subjects use these social platforms to express their frustration, excitement, and opinions. And their statements with regards to the services they are subscribed to are no exception. While some people might not have a social media presence most do and each customer of a company can be characterized by his/her SMP. This profile includes a history of their generated social content across all social media outlets. SMPs can be leveraged to determine whether a particular customer is at risk of cancelling their service/subscription. This information can then be delivered to the businesses that are at risk. Note that it makes a considerable difference to know about this risk upfront, even before the customer knows they might churn, than to wait until they contact the company and ask to terminate their contract.

Examples of how the method in the present invention uses real time and historical SMPs to help the businesses retain at risk customers, include:

1. A telecommunications customer tweets that they think their "internet subscription" is expensive compared to others. Even though the customer didn't specifically mention the company, the solution detects the concern and notifies the company who proactively offers to reduce the customer's internet fees.
2. An insurance customer asks his/her peers via FACEBOOK posts if they have experienced the same excessive wait time when trying to contact the company's customer service desk. The insurance company calls the customer back to directly solicit the customer's feedback and apologizes for long waits during the customer's recent calls.
3. A cable customer writes a blog post complaining that their premium cable package doesn't include important hockey games. The cable company proactively offers the customer a discount that includes additional channels which include the important hockey games.
4. A wireless phone customer sends several pictures of their data usage with angry comments about being charged for extra data usage. The wireless company sends an email to the customer notifying them that they have doubled their limits for being a loyal customer.

In another embodiment, the present invention processes SMPs of customers in real time and generates churn notifications if the customers are engaged in conversations with their competitors. This engagement can be a signal of their intention to explore the opportunity of switching service/subscription providers. While a single posting to a competitor does not necessarily indicate the customer will churn, the cumulative engagement with rival companies can significantly strengthen the signal and more definitively indicate an upcoming switch.

In another aspect, the present invention analyzes the whole history of the SMPs with a goal of determining how loyal each customer generally is to services and subscriptions. As explained earlier, not every individual has the same personality type when it comes to dealing with their subscriptions. Some individuals frequently change service providers while others only change if absolutely required (e.g. they move to a new city and the old provider is not available in the new geographical area). Customers sometimes display this predisposition in social media outlets. By analyzing the customer's history on social media platforms, it is possible to determine the customer's predisposition to and frequency of switching changing providers. This information can be used in determining the customer's churn risk with a specific provider.

Another embodiment of the present invention is to address the influence of the social network connections on the company's customers. If a customer's very close friend had an alarming experience with the same company and shares it on a social media platform, it is likely that the customer is going to reconsider their relationship with the company.

More examples of how the above embodiments can be used to help companies reduce customer churn are presented in the following:

1. An insurance company's customer posts "Do you offer special promotions for your most long term loyal customers?" on a rival company FACEBOOK account. This, in combination with the customer's SMP, triggers a churn notification and delivers it to the current insurance company. The current insurance company realizes that this customer might switch because she/he believes that long term customers should be eligible for extra discounts. They send a special promotion and thank you card to the customer demonstrating they appreciate their business.
2. A cable company's customer regularly posts on TWITTER. In January, 2014 they posted "Just signed up with cable company A. In June 2014, they posted "Just switched to cable company B". In December 2014, they posted "It's time to switch again. Happy to be a customer of cable company C". The system finds this pattern and sends a notification to cable company C that the customer has a propensity to switch service providers every 6 months. The cable company proactively reaches out after 4 months with a special promotion to retain the customer.
3. A close friend of a bank's customer posted "Bank X was offering a limited time extra 2% interest for opening a new savings account. Got the deal!" on TWITTER. Also the customer's sister retweeted a friend's message "Bank X is waiving checking account fees if you open a new account in the next two months!". These are processed as social network influencer features and trigger a churn risk. The current bank is notified and can take action to retain their customer.

Predicting Churn Using Similarity to Cohorts

As mentioned in the summary and title, one aspect of the invention is to predict communities of customers with certain churn behaviors. To accomplish this, clusters of patrons are created. Individual customers are then compared to these clusters and the individual's churn probability can be inferred from the community that they belong to. The present invention, calls these groups of customers with similar churn behaviors "cohorts". While the people in each cohort may not necessarily share the same demographics, they are similar in terms of their SMPs, engagement with rival companies, degree of loyalty towards services/subscriptions, and also influences from their social network. Therefore, their churn risk scores are to be very close to each other based on those constituents.

The present invention leverages existing clustering algorithms to create these churn cohorts. Similar to any clustering algorithm, a set of useful features are extracted from customers' SMPs. Some of these features are natural language components while others are numerical. Each of the natural language features goes through a pipeline of natural language processing techniques and is eventually transformed to a numerical feature. The clustering algorithm will work with a vector of numeric features.

The initial set of cohorts is created from a manually annotated set of customers. This is the training data set that the cohorts are constructed from and used for answering churn prediction questions. The customers in the training set are annotated with churned and not churned labels. Features for each customer are extracted and the clustering algorithm computes the cohorts from these feature vectors. Most features are calculated for three time periods: 1) short term 2) medium term, and, 3) long term history. For the purposes of the present invention, 1 week, 1 month, and 6 months are used respectively for each time periods but other alternatives can also be employed.

Below is the list of features that are used to train the direct customer feedback cohorts. Other features may be included as applicable.

$$v_{Customer\ Cohort} = \\ (Neg_{Dir_{1w}}, Neg_{Dir_{1m}}, Neg_{Dir_{6m}}, Neg_{Ind_{1w}}, Neg_{Ind_{1m}}, Neg_{Ind_{6m}}, News_{1w}, \\ News_{1m}, News_{6m}, Pos_{Dir_{1w}}, Pos_{Dir_{1m}}, Pos_{Dir_{6m}}, Pos_{Ind_{1w}}, Pos_{Ind_{1m}}, \\ Pos_{Ind_{6m}}, Comp_{Quest_{1w}}, Comp_{Quest_{1m}}, Comp_{Quest_{6m}}, Comp_{news_{1w}}, \\ Comp_{News_{1m}}, Comp_{News_{6m}}, Cancel_{1y}, Cancel_{2y}, Renew_{1y}, Renew_{2y})$$

Neg_Dir_1w (Direct negative in the past week): Negative sentiment score inferred from social contents that are directed at the current company. This is a score that is calculated from the SMP of the customer in the past week.

Neg_Dir_1m (Direct negative in the past month): Negative sentiment score inferred from social contents of a specific customer that are directed at the current company. This is a score that is calculated from the SMP of the customer in the past month.

Neg_Dir_6m (Direct Negative in the past 6 months): Negative sentiment score inferred from social contents of a specific customer that are directed at the current company. This is a score that is calculated from the SMP of the customer in the past 6 months.

Neg_Indir_1w (Indirect negative in the past week): Negative sentiment score inferred from social contents of a specific customer that are indirectly mentioned about the current company. These include contents about the industrial expertise of the company. This is a score that is calculated from the SMP of the customer in the past week.

Neg_Indir_1m (Indirect negative in the past month): Negative sentiment score inferred from social contents of a specific customer that are indirectly mentioned about the current company. These include contents about the industrial expertise of the company. This is a score that is calculated from the SMP of the customer in the past month.

Neg_Indir_6m (Indirect Negative in the past 6 months): Negative sentiment score inferred from social contents of a specific customer that are indirectly mentioned about the current company. These include contents about the industrial expertise of the company. This is a score that is calculated from the SMP of the customer in the past 6 months.

Pos_Dir_1w (Direct positive in the past week): Positive sentiment score inferred from social contents of a specific customer that are directed at the current company. This is a score that is calculated from the SMP of the customer in the past week.

Pos_Dir_1m (Direct positive in the past month): Positive sentiment score inferred from social contents of a specific customer that are directed at the current company. This is a score that is calculated from the SMP of the customer in the past month.

Pos_Dir_6m (Direct positive in the past 6 months): Positive sentiment score inferred from social contents of a specific customer that are directed at the current company. This is a score that is calculated from the SMP of the customer in the past 6 months.

Pos_Indir_1w (Indirect positive in the past week): Positive sentiment score inferred from social contents of a specific customer that are indirectly mentioned about the current company. These include contents about the industrial expertise of the company. This is a score that is calculated from the SMP of the customer in the past week.

Pos_Indir_1m (Indirect positive in the past month): Positive sentiment score inferred from social contents of a specific customer that are indirectly mentioned about the current company. These include contents about the industrial expertise of the company. This is a score that is calculated from the SMP of the customer in the past month.

Pos_Indir_6m (Indirect positive in the past 6 months): Positive sentiment score inferred from social contents of a specific customer that are indirectly mentioned about the current company. These include contents about the industrial expertise of the company. This is a score that is calculated from the SMP of the customer in the past 6 months.

News_1w (News about current company in the past week): Neutral news announcement score inferred from social contents of a specific customer about the current company. This is a score that is calculated from the SMP of the customer in the past week.

News_1m (News about current company in the past month): Neutral news announcement score inferred from social contents of a specific customer about the current company. This is a score that is calculated from the SMP of the customer in the past week.

News_6m (News about current company in the past 6 months): Neutral news announcement score inferred from social contents of a specific customer about the current company. This is a score that is calculated from the SMP of the customer in the past week.

Comp_Quest_1w (Asking questions from a competitor in the past week): Engaging in questions score inferred from questions posed on competitor company's social media platforms by a specific customer. This is a score that is calculated from questions posted on social media accounts (e.g. Tweets, FACEBOOK posts, GOOGLE+ posts, etc.) of rival companies in the past week.

Comp_Quest_1m (Asking questions from a competitor in the past week): Engaging in questions score inferred from questions posed on competitor company's social media platforms by a specific customer. This is a score that is calculated from questions posted on social media accounts (e.g. Tweets, FACEBOOK posts, GOOGLE+ posts, etc.) of rival companies in the past week.

Comp_Quest_6m (Asking questions from a competitor in the past week): Engaging in questions score inferred from questions posed on competitor company's social media platforms by a specific customer. This is a score that is calculated from questions posted on social media accounts (e.g. Tweets, FACEBOOK posts, GOOGLE+ posts, etc.) of rival companies in the past week.

Comp_news_1w (News about a competitor in the past week): Neutral news announcement score inferred from social contents about the rival company by a specific customer. This is a score that is calculated from the social media contents (e.g. Tweets, FACEBOOK posts, GOOGLE+ posts, etc.) in the past week.

Comp_news_1m (News about a competitor in the past month): Neutral news announcement score inferred from social contents about the rival company by a specific customer. This is a score that is calculated from the social media contents (e.g. Tweets, FACEBOOK posts, GOOGLE+ posts, etc.) in the past month.

Comp_news_6m (News about a competitor in the past 6 months): Neutral news announcement score inferred from social contents about the rival company by a specific customer. This is a score that is calculated from the social media contents (e.g. Tweets, FACEBOOK posts, GOOGLE+ posts, etc.) in the past 6 months.

Cancel_1y (Services canceled in the past year): Service cancellation score inferred from the number of service/subscription cancellation announcements by a specific customer. This is a score that is calculated from the SMP of the customer in the past year.

Cancel_2y (Services canceled in the past 2 years): Service cancellation score inferred from the number of service/subscription cancellation announcements by a specific customer. This is a score that is calculated from the SMP of the customer in the past 2 years.

Renew_1y (Services renewed in the past year): Service renewal score inferred from the number of service/subscription renewal announcements by a specific customer. This is a score that is calculated from the SMP of the customer in the past year.

Renew_2y (Services renewed in the past two years): Service renewal score inferred from the number of service/subscription renewal announcements by a specific customer. This is a score that is calculated from the SMP of the customer in the past year.

The social network features that are used to train the social network influenced cohorts are presented in the following. Other features may be included as applicable.

$$v_{Network\ Cohort} = (Net1_{Neg_{1w}}, Net1_{Neg_{1m}}, Net1_{Neg_{6m}}, Net2_{Neg}, Net2_{Neg_{1m}},$$
$$Net2_{Neg_{6m}}, Net1_{Pos_{1w}}, Net1_{Pos_{1m}}, Net1_{Pos_{6m}}, Net2_{Pos_{1w}},$$
$$Net2_{Pos_{1m}}, Net2_{Pos_{6m}}, Net1_{Disc_{1w}}, Net1_{Disc_{1m}}, Net1_{Disc_{6m}},$$
$$Net2_{Disc_{1w}}, Net2_{Disc_{1m}}, Net2_{Disc_{6m}}, Net1_{Enc_{1w}}, Net1_{Enc_{1m}},$$
$$Net1_{Enc_{6m}}, Net2_{Enc_{1w}}, Net2_{Enc_{1m}}, Net2_{Enc_{6m}}, Net1_{Churn_{1w}},$$
$$Net1_{Churn_{1m}}, Net1_{Churn_{6m}}, Net2_{Churn_{1w}}, Net2_{Churn_{1m}}, Net2_{Churn_{6m}})$$

Net1_Neg_1w (Negative in close social network in the past week): Negative sentiment score inferred from social contents that are generated from the customer's first circle of social network about the current company. First circle includes acquaintances that are direct connections and also have high influence on the customer. This is a score that is calculated from the social media contents (e.g. Tweets, FACEBOOK posts, GOOGLE+ posts, etc.) in the past week.

Net1_Neg_1m (Negative in close social network in the past month): Negative sentiment score inferred from social contents that are generated from the customer's first circle of social network about the current company. First circle includes acquaintances that are direct connections and also have high influence on the customer. This is a score that is calculated from the social media contents (e.g. Tweets, FACEBOOK posts, GOOGLE+ posts, etc.) in the past month.

Net1_Neg_6m (Negative in close social network in the past 6 months): Negative sentiment score inferred from social contents that are generated from the customer's first circle of social network about the current company. First circle includes acquaintances that are direct connections and also have high influence on the customer. This is a score that is calculated from the social media contents (e.g. Tweets, FACEBOOK posts, GOOGLE+ posts, etc.) in the past 6 months.

Net1_Pos_1w (Positive in close social network in the past week): Positive sentiment score inferred from social contents that are generated from the customer's first circle of social network about the current company. First circle includes acquaintances that are direct connections and also have high influence on the customer. This is a score that is calculated from the social media contents (e.g. Tweets, FACEBOOK posts, GOOGLE+ posts, etc.) in the past week.

Net1_Pos_1m (Positive in close social network in the past month): Positive sentiment score inferred from social contents that are generated from the customer's first circle of social network about the current company. First circle includes acquaintances that are direct connections and also have high influence on the customer. This is a score that is calculated from the social media contents (e.g. Tweets, FACEBOOK posts, GOOGLE+ posts, etc.) in the past month.

Net1_Pos_6m (Positive in close social network in the past 6 months): Positive sentiment score inferred from social contents that are generated from the customer's first circle of social network about the current company. First circle includes acquaintances that are direct connections and also have high influence on the customer. This is a score that is calculated from the social media contents (e.g. Tweets, FACEBOOK posts, GOOGLE+ posts, etc.) in the past 6 months.

Net2_Neg_1w (Negative in distant social network in the past week): Negative sentiment score inferred from social contents that are generated from the customer's second circle of social network about the current company. Second circle includes acquaintances that are direct connections and but are not in the first circle. This is a score that is calculated from the social media contents (e.g. Tweets, FACEBOOK posts, GOOGLE+ posts, etc.) in the past week.

Net2_Neg_1m (Negative in distant social network in the past month): Negative sentiment score inferred from social contents that are generated from the customer's second circle of social network about the current company. Second circle includes acquaintances that are direct connections and but are not in the first circle. This is a score that is calculated from the social media contents (e.g. Tweets, FACEBOOK posts, GOOGLE+ posts, etc.) in the past month.

Net2_Neg_6m (Negative in distant social network in the past 6 months): Negative sentiment score inferred from social contents that are generated from the customer's second circle of social network about the current company. Second circle includes acquaintances that are direct connections and but are not in the first circle. This is a score that is calculated from the social media contents (e.g. Tweets, FACEBOOK posts, GOOGLE+ posts, etc.) in the past 6 months.

Net2_Pos_1w (Positive in distant social network in the past week): Positive sentiment score inferred from social contents that are generated from the customer's second circle of social network about the current company. Second circle includes acquaintances that are direct connections and but are not in the first circle. This is a score that is calculated from the social media contents (e.g. Tweets, FACEBOOK posts, GOOGLE+ posts, etc.) in the past week.

Net2_Pos_1m (Positive in distant social network in the past month): Positive sentiment score inferred from social contents that are generated from the customer's second circle of social network about the current company. Second circle includes acquaintances that are direct connections and but are not in the first circle. This is a score that is calculated from the social media contents (e.g. Tweets, FACEBOOK posts, GOOGLE+ posts, etc.) in the past month.

Net2_Pos_6m (Positive in distant social network in the past 6 months): Positive sentiment score inferred from social contents that are generated from the customer's second circle of social network about the current company. Second circle includes acquaintances that are direct connections and but are not in the first circle. This is a score that is calculated from the social media contents (e.g. Tweets, FACEBOOK posts, GOOGLE+ posts, etc.) in the past week.

Net1_Disc_1w (Discourage current service in close social network in the past week): Discouragement sentiment score inferred from social contents that are generated from the customer's first circle of social network and discouraging the use of current company services. First circle includes acquaintances that are direct connections and also have high influence on the customer. This is a score that is calculated from the social media contents (e.g. Tweets, FACEBOOK posts, GOOGLE+ posts, etc.) in the past week.

Net1_Disc_1m (Discourage current service in close social network in the past month): Discouragement sentiment score inferred from social contents that are generated from the customer's first circle of social network and discouraging the use of current company services. First circle includes acquaintances that are direct connections and also have high influence on the customer. This is a score that is calculated from the social media contents (e.g. Tweets, FACEBOOK posts, GOOGLE6+ posts, etc.) in the past month.

Net1_Disc6m (Discourage current service in close social network in the past 6 months): Discouragement sentiment score inferred from social contents that are generated from the customer's first circle of social network and discouraging the use of current company services. First circle includes acquaintances that are direct connections and also have high influence on the customer. This is a score that is calculated from the social media contents (e.g. Tweets, FACEBOOK posts, GOOGLE+ posts, etc.) in the past 6 months.

Net1_Enc_1w (Encourage joining competitor in close social network in the past week): Encouragement sentiment score inferred from social contents that are generated from the customer's first circle of social network and encouraging the use of rival companies' services. First circle includes acquaintances that are direct connections and also have high influence on the customer. This is a score that is calculated from the social media contents (e.g. Tweets, FACEBOOK posts, GOOGLE+ posts, etc.) in the past week.

Net1_Enc_1m (Encourage joining competitor in close social network in the past month): Encouragement sentiment score inferred from social contents that are generated from the customer's first circle of social network and encourage the use of rival companies services. First circle includes acquaintances that are direct connections and also have high influence on the customer. This is a score that is calculated from the social media contents (e.g. Tweets, FACEBOOK posts, GOOGLE+ posts, etc.) in the past month.

Net1_Enc_6m (Encourage joining competitor in close social network in the past 6 months): Encouragement sentiment score inferred from social contents that are generated from the customer's first circle of social network and encourage the use of rival companies services. First circle includes acquaintances that are direct connections and also have high influence on the customer. This is a score that is calculated from the social media contents (e.g. Tweets, FACEBOOK posts, GOOGLE+ posts, etc.) in the past 6 months.

Net2_Disc_1w (Negative in distant social network in the past week): Discouragement sentiment score inferred from social contents that are generated from the customer's second circle of social network and discourage the use of current company services. Second circle includes acquaintances that are direct connections and but not in the first circle. This is a score that is calculated from the social media contents (e.g. Tweets, FACEBOOK posts, GOOGLE+ posts, etc.) in the past week.

Net2_Disc_1m (Negative in distant social network in the past month): Discouragement sentiment score inferred from social contents that are generated from the customer's second circle of social network and discourage the use of current company services. Second circle includes acquaintances that are direct connections and but not in the first circle. This is a score that is calculated from the social media contents (e.g. Tweets, FACEBOOK posts, GOOGLE+ posts, etc.) in the past month.

Net2_Disc_6m (Negative in distant social network in the past 6 months): Discouragement sentiment score inferred from social contents that are generated from the customer's second circle of social network and discourage the use of current company services. Second circle includes acquaintances that are direct connections and but not in the first circle. This is a score that is calculated from the social media contents (e.g. Tweets, FACEBOOK posts, GOOGLE+ posts, etc.) in the past 5 month.

Net2_Enc_1w (Encourage joining competitor in distant social network in the past week): Encouragement sentiment score inferred from social contents that are generated from the customer's second circle of social network and encourage the use of rival companies services. Second circle includes acquaintances that are direct connections and but not in the first circle. This is a score that is calculated from the social media contents (e.g. Tweets, FACEBOOK posts, GOOGLE+ posts, etc.) in the past week.

Net2_Enc_1m (Encourage joining competitor in distant social network in the past month): Encouragement sentiment score inferred from social contents that are generated from the customer's second circle of social network and encourage the use of rival companies services. Second circle includes acquaintances that are direct connections and but not in the first circle. This is a score that is calculated from the social media contents (e.g. Tweets, FACEBOOK posts, GOOGLE+ posts, etc.) in the past month.

Net2_Enc_6m (Encourage joining competitor in distant social network in the past 6 months): Encouragement sentiment score inferred from social contents that are generated from the customer's second circle of social network and encourage the use of rival companies services. Second circle includes acquaintances that are direct connections and but not in the first circle. This is a score that is calculated from the social media contents (e.g. Tweets, FACEBOOK posts, GOOGLE+ posts, etc.) in the past 6 months.

Net1_Churn_1w (Churn in close social network in the past week): Churn announcement score inferred from social contents that are generated from the customer's first circle of social network and indicates that they churned. First circle includes acquaintances that are direct connections and also have high influence on the customer. This is a score that is calculated from the social media contents (e.g. Tweets, FACEBOOK posts, GOOGLE+ posts, etc.) in the past week.

Net1_Churn_1m (Churn in close social network in the past month): Churn announcement score inferred from social contents that are generated from the customer's first circle of social network and indicates that they churned. First circle includes acquaintances that are direct connections and also have high influence on the customer. This is a score that is calculated from the social media contents (e.g. Tweets, FACEBOOK posts, GOOGLE+ posts, etc.) in the past week.

Net1_Churn_6m (Churn in close social network in the past 6 months): Churn announcement score inferred from social contents that are generated from the customer's first circle of social network and indicates that they churned. First circle includes acquaintances that are direct connections and also have high influence on the customer. This is a score that is calculated from the social media contents (e.g. Tweets, FACEBOOK posts, GOOGLE+ posts, etc.) in the past week.

Net2_Churn_1w (Churn in distant social network in the past week): Churn announcement score inferred from social contents that are generated from the customer's second circle of social network and indicates that they churned. Second circle includes acquaintances that are direct connections and but not in the first circle. This is a score that is calculated from the social media contents (e.g. Tweets, FACEBOOK posts, GOOGLE+ posts, etc.) in the past week.

Net2_Churn_1m (Churn in distant social network in the past month): Churn announcement score inferred from social contents that are generated from the customer's second circle of social network and indicates that they churned. Second circle includes acquaintances that are direct connections and but not in the first circle. This is a score that is calculated from the social media contents (e.g. Tweets, FACEBOOK posts, GOOGLE+ posts, etc.) in the past month.

Net2_Churn_6m (Churn in distant social network in the past 6 months): Churn announcement score inferred from social contents that are generated from the customer's second circle of social network and indicates that they churned. Second circle includes acquaintances that are direct connections and but not in the first circle. This is a score that is calculated from the social media contents (e.g. Tweets, FACEBOOK posts, GOOGLE+ posts, etc.) in the past 6 months.

First and Second Circle in Customers Social Network

The present invention utilizes several features in churn risk prediction as provided herein. Cohorts are selected/composed based on social network influence. For greater detailed descriptions, these are named with Net1 or Net2 prefixes herein.

An aspect of the invention employs "first circle versus second circle" in a user's social network(s). The first and second circles are assumed to be direct friends in a customer social network, but the difference is that the first circle has a greater influence on the customer behavior than the second circle. It is worth noting, that even though first and second circle are expressed as direct friends in a social network, within preferred aspects of the present invention, the understood scope/definition of first and second circle is more generic and is applicable to nth order connections (e.g. friend of a friend, or friend of a friend of a friend) and direct connections are only used as one example.

A connection has various terminologies in different social networks. A connection is equivalent to "friend", "follower/followee", and "connection" in FACEBOOK, TWITTER, and LINKEDIN respectively. In the present invention, "connection" is used as the generic terminology that represents that two accounts are related to each other directly on a social network.

In order to determine the first and second circles, the following metrics are calculated for each connection of a customer. These metrics are then added together to create a general "influence" score. All connections with an influence score above a threshold are considered to be in the first circle and the rest of the connections are defined as the second circle.

Favoriting metric 621: This metric captures the actions that can be translated as favoriting particular contents from a connection. For example, "liking" a photo or a post in FACEBOOK is a favoriting action. A higher number of favoriting of a connection leads to a higher favoriting metric for that connection.

Mentions metric 622: This metric captures the mentions of a connection on the social media platform from the customer. For example, tagging a connection in a photo is a mention, tagging someone in a tweet is also a mention. A higher number of mentions of a connection leads to a higher mention metric for that connection.

Explicit relationship metric 623: This metric captures the explicit relationships that some social media platforms provide. For example, a "sister" relationship or "married" relationship in FACEBOOK is a form of explicit relationship. Each kind of relationship has its own weight in the present invention. For example, "married" leads to a higher score than "cousin".

Shared interest metric 624: This metric captures the commons interests between a patron and its connection. Following the same company on LINKEDIN is an example of a shared interest. Liking the same FACEBOOK page is also another example. A higher number of commons interests leads to a higher shared interest metric.

Engagement metric 625: This metric captures the level of engagement between a user and its connection. Commenting on a connection's photo is considered a single engagement for instance. Being tagged in the same photo is another example. A higher number of engagements leads to higher engagement metric.

Prediction of Churn Probability from Cohorts

In the previous section, a number of features were described. Namely, two different vectors of features and their feature elements were discussed. $V_{Customer\ Cohort}$ is the set of vectors that are used for creating one category of clusters that are mainly based on features that represent the individual customer. The second set of vectors, $V_{Network\ Cohort}$ is the vector set that are mainly composed of features that represent the social network of the customer and hence incorporate the social network influence for a particular patron.

For the training set C of customers with labeled each patron c a pair of vectors $(c_{V_{Customer\ Cohort}}, C_{V_{Network\ Cohort}})$ is constructed. Let $V=\{C_{V_{Customer\ Cohort}}: c \in C\}$ and $N=\{c_{V_{Network\ Cohort}}: c \in C\}$. Three clustering algorithms Alg1, Alg2, and Alg3 are defined below:

ALG1: k-means using Manhattan distance
ALG2: k-medoids using euclidean distance
ALG3: Agglomerative using group average All three of these algorithms are processed on the two sets of vectors V and N defined above. The result is 6 groups of clusters that represent cohorts. The present invention uses an ensemble method comprised of, in one preferred aspect, the above six cohort groups to predict the final churn probability of a customer. Once the six cluster groups are created from the training model, the churn probability of new patron can be calculated as follows:

Let $$\text{Closest}_i(S,v) = \{\text{distance}(s_j,v) \leq \text{distance}(s_k,v) : j \in \{1 \ldots i\}, s_k = k\text{th vector from } v, s \in S\}$$

Let $$P(ALG, S, v) = \{\Sigma \text{ churn}/\Sigma \text{ nochurn}: \text{churn, nochurn} \in C = \{c \text{ Closest}_i(ALG(S), v)\}$$

$$\text{Let } p_{Customer\ Cohort} = 1/3 \sum_{i=1}^{3} P(ALG_i, V, c_{v_{Customer\ Cohort}})$$

$$\text{Let } p_{Network\ Cohort} = 1/3 \sum_{i=1}^{3} P(ALG_i, N, c_{v_{Network\ Cohort}})$$

$$\text{Let } P_{churn} = \alpha \cdot P_{Customer\ Cohort} + \beta \cdot P_{Network\ Cohort} \text{ w where } \alpha + \beta = 1$$

In order to give more weight to customer cohorts which are direct representative of customer behavior versus network cohorts, the present invention uses $\alpha=0.7$, $\beta=0.3$ in its current form but all other variations of these weight assignments are considered embodiments of the present invention.

In summary, within the method of the invention, multiple clustering analyses generate "cohorts" of customers. A voting mechanism computes a probability from both customer cohorts and network cohorts, and eventually a weighting scheme calculates the final churn possibility of a customer.

Further Comments on Preferred Aspects of the Invention

The present invention uses, in a preferred aspect, one or more of the following components to effectively predict churn risk:

1. Automatic identification of the social profiles for each customer's contact record. For example, given an email address, a step in the process of the invention will find the customer's social media profiles on networks such as TWITTER, FACEBOOK, INSTAGRAM and LINKEDIN. This enables the gathering of all signals publically shared by the customer (as compared to only explicit mentions of a brand which are detected by social listening solutions).
2. In addition to identifying the customer's SMP, a step in the process of the invention also identifies other members of an account that the company may not be directly aware of and listens for their social signals as well. For example, a telecommunications account may be registered under a father's name, but his live at home daughter may vocally share their family's frustrations about the telecommunications company. A step in the process of the invention determines these relationships using strategies such as name similarity, the content and frequency of social engagements and geo specific information.
3. The invention also identifies other social media users that are influential to the individual customer and other account holders. For example, if an influencer tries to get a customer to switch it greatly increases their churn risk. Similarly, a step in the process of the invention determines the relative value of the influencer to the organization based on their influence.
4. A step in the process of the invention identifies communities of social media users based on implicit relationships instead of relationships explicitly observable in the network structure. For example, by identifying communities of users with common interests the process of the invention can then use the churn history of the community members to calculate the churn probability of a given individual community member.
5. As part of the churn analysis, a step in the process of the invention detects a wide variety of social signals including but not limited to: customers explicitly or implicitly mentioning a company's or competitor's brand or service and interacting with a company or competitor by following their social media account and/or favoriting/retweeting their content. It is important to note that the process not only looks at individual signals, but also the totality or stream of signals.
6. As part of the churn analysis, a step in the process of the invention detects how a customer interacts with the company. In particular, the process detects and assesses the sentiment of explicit or implicit conversations and/or mentions of the company's brands and services, interactions such as following social media accounts, and signals such as favoriting or retweeting content. It is important to note that the process not only looks at individual signals, but also the totality or stream of signals.
7. In addition to listening to company related signals, a step in the process of the invention also detects the same signals as related to competitors and their services.
8. The invention also uses a broader array of content to assess the customer's overall personality type. In particular, the customer's general propensity to be loyal to their service providers or regularly switch providers. As well, the frequency with which a customer typically switches providers.

DETAILED DESCRIPTION OF THE FIGURES

FIG. 1 100 summarized the system of the present invention. The invention starts from a collection of inputs for each service-based or subscription company and finishes with a continuous stream of churn signal deliveries. The system is comprised of the following components:

1. Input 111: The input of the system is a collection of whatever information the company has from their customers. Most notably, email, name, phone number and address.
2. Social Media Finder 114: This is a third party service that accepts people's information and produces all available social handles for them.
3. Social Proact 112: This is a web interface for managing users to be monitored and viewing churn signals.
4. Customer Database 113: The database of customers with their information such as name, email, etc. plus all their social media account handles.
5. Social Aggregator 115: This is a service that monitors the social media streams of all users that are being monitored for each company. This uses the social media handles generated from Social Media Finder component. New posts, tweets, and images persist as they are generated.
6. Social Prediction Scheduler 122: This component runs periodically and finds users that have generated new social content. If the new content could be helpful in churn prediction, a prediction task is scheduled for the Social Predictor component.

7. Social Predictor 121: Every time a prediction task is assigned to this component, the full social media profile of that customer is analyzed, different features are computed and if the customer has a churn risk, this component asks the Churn Delivery Service to notify the appropriate companies. The churn signals include the customer id, a probability of churn, and also a brief summary of why the system has flagged this customer as a churn risk.

8. Churn Delivery Service 131: This is a service that delivers new churn signals to companies as soon as the Social Predictor finds new customers that are at risk of leaving their current company.

9. Output 141: The output of the system is a collection of churn signals that are delivered to companies in real time. Since taking the proper measures on time is very important, these signals are delivered in real time as soon as they are generated by the Social Predictor. Churn Delivery Service is responsible for the delivery of the output to the proper destination (usually companies' CRM solutions).

Figure 2:
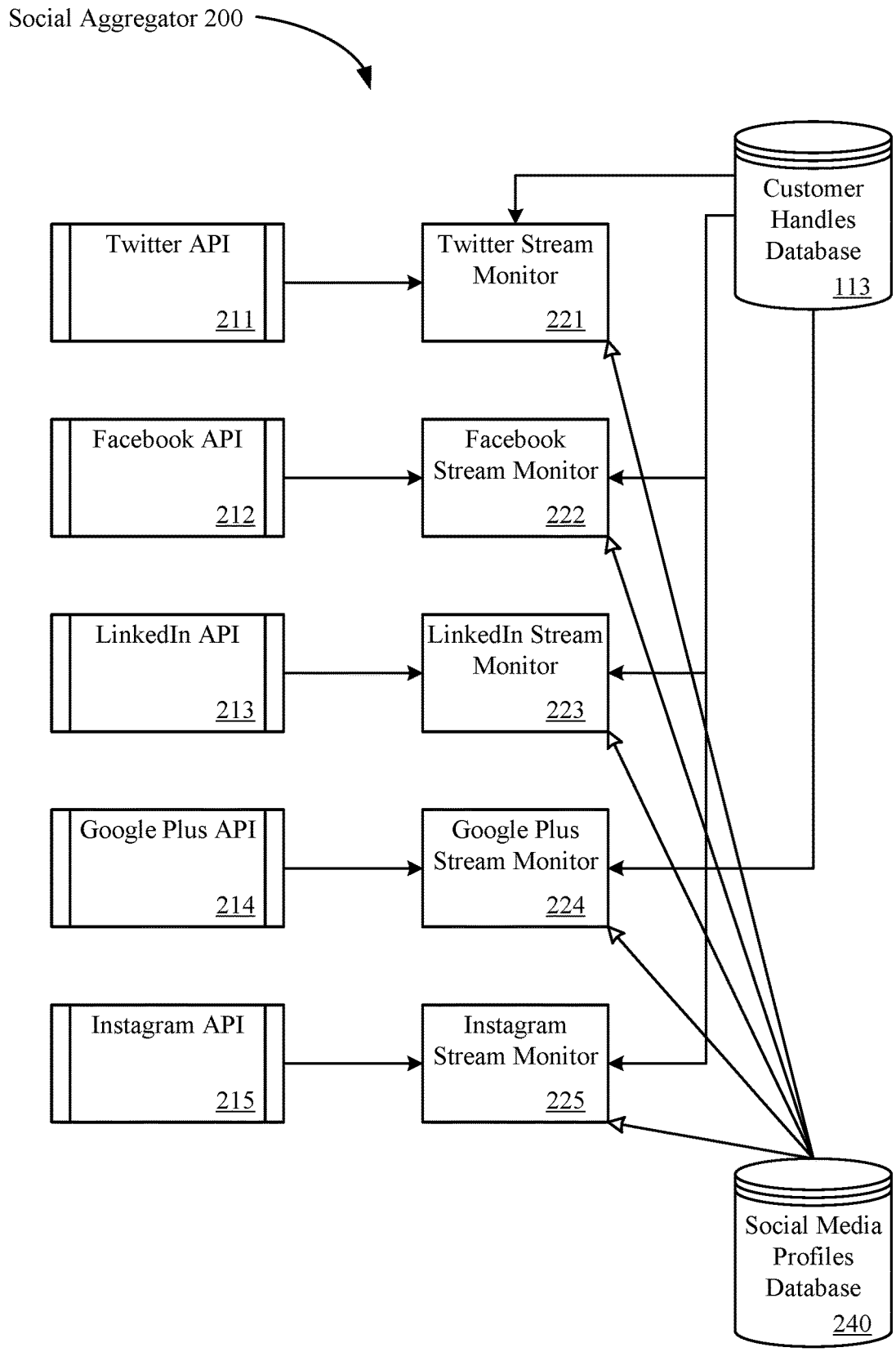
FIG. 2 is a diagram of the Social Aggregator 200 component of the present invention that creates a database of social media profiles 240.

FIG. 2 200 depicts the details of how the Social Aggregator works. This component is responsible for creating and maintaining "social media profiles" for all customers. This component is comprised of the following:

1. Customer Handles Database 113: This is a database of user account handles that have been found by the Social Media Finder. These are used to monitor all social media accounts of all customers in real time.
2. TWITTER Stream Monitor 221: This component subscribes to TWITTER streams for all the customer handles that exist in the system. As soon as new tweets are generated for those users, they are stored in a database server.
3. FACEBOOK Stream Monitor 222: This component subscribes to FACEBOOK streams for all the customer handles that exist in the system. As soon as new posts are generated for those users, they are stored in a database server.
4. LINKEDIN Stream Monitor 223: This component subscribes to LINKEDIN streams for all the customer handles that exist in the system. As soon as new posts are generated for those users, they are stored in a database server.
5. GOOGLE Plus Stream Monitor 224: This component subscribes to GOOGLE Plus streams for all the customer handles that exist in the system. As soon as new posts are generated for those users, they are stored in a database server.
6. INSTAGRAM stream monitor 225: This component subscribes to INSTAGRAM streams for all the customer handles that exist in the system. As soon as new posts are generated for those users, they are stored in a database server.
7. TWITTER API 211: The web API endpoint to pull new TWITTER 521 contents for each customer account.
8. FACEBOOK API 212: The web API endpoint to pull new FACEBOOK contents 522 for each customer account.
9. LINKEDIN API 213: The web API endpoint to pull new LINKEDIN contents 523 for each customer account.
10. GOOGLE Plus API 214: The web API endpoint to pull new GOOGLE Plus contents 524 for each customer account.
11. INSTAGRAM API 215: The web API endpoint to pull new INSTAGRAM contents 525 for each customer account.
12. Social Media Profiles Database 240: This is a database that stores all the history of social media contents for the users in a central location to be used by the Social Predictor component. In an embodiment a user's social media profile may include private material on his/her social media accounts that is available to the social media accounts of the companies to which he/she has subscribed but not the general public.

Figure 3:
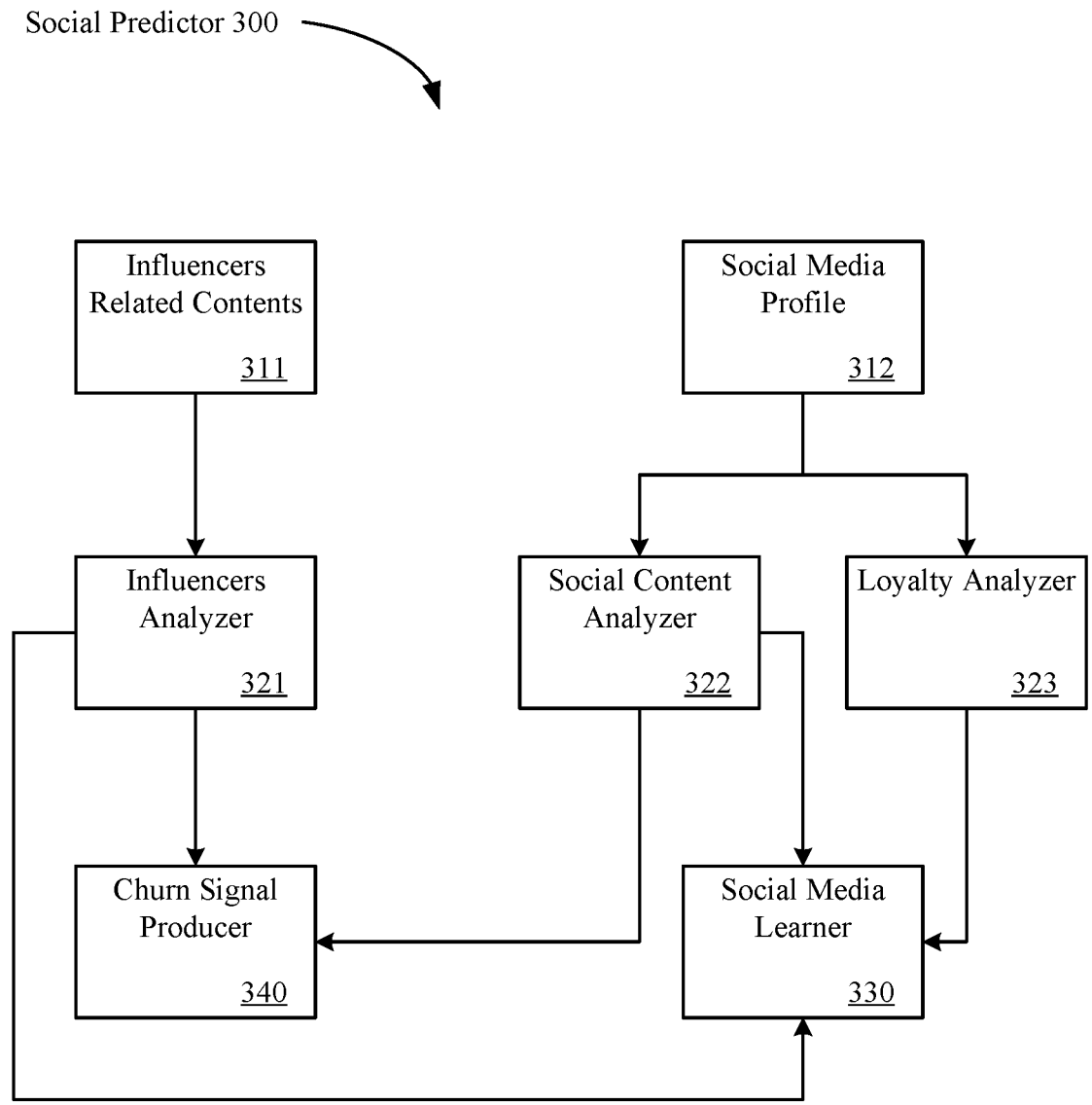
FIG. 3 is a diagram 300 of the Social Predictor sub-component 121 that can predict the churn risk of patrons.

FIG. 3 300 illustrates the sub-components of the Social Predictor component. This part is responsible for generating the churn signals for a community of users from their SMP history. The sub-components are:

1. Input: The input to this component is a local user id that can be used to retrieve all the social media material generated by that user which is already populated in a database server by Social Media Aggregator.
2. Social Media Profile 312: This is a history of all social media material generated by a customer.
3. Influencers Related Contents 311: These are the social media contents that are generated by someone in the social network of the particular customer but are also relevant to the services/subscriptions he/she currently has.
4. Loyalty Analyzer 323: This sub-component goes through the historical data and determines if the customer is a loyal patron to his/her providers or not.
5. Social Content Analyzer 322: This sub-component analyzes all of the historical data to find patterns that indicate the customer is likely to churn.
6. Influencers Analyzer 321: This sub-component analyzes the social media materials generated by peers in the social network of the customer to measure how likely he/she will be to be influenced by others and leave their current contract/service.
7. Social Media Learner 330: This is not a real time sub-component. But instead an offline process that tries to find patterns for customers with a high likeliness of churn. Once patterns are found, they are stored as prediction models to be used by each of the above analyzers.
8. Churn Signal Producer 340: Once all levels of analysis are done for a customer, this sub-component determines if a churn signal needs to be delivered to the relevant companies. If a churn signal is bound to be delivered, a probability measure is attached to the signal. Besides the probability, a brief description of the indications that led to the signal is also generated. This can be used by customer retention employees to take the optimal action to keep the customer's business.

Figure 4:
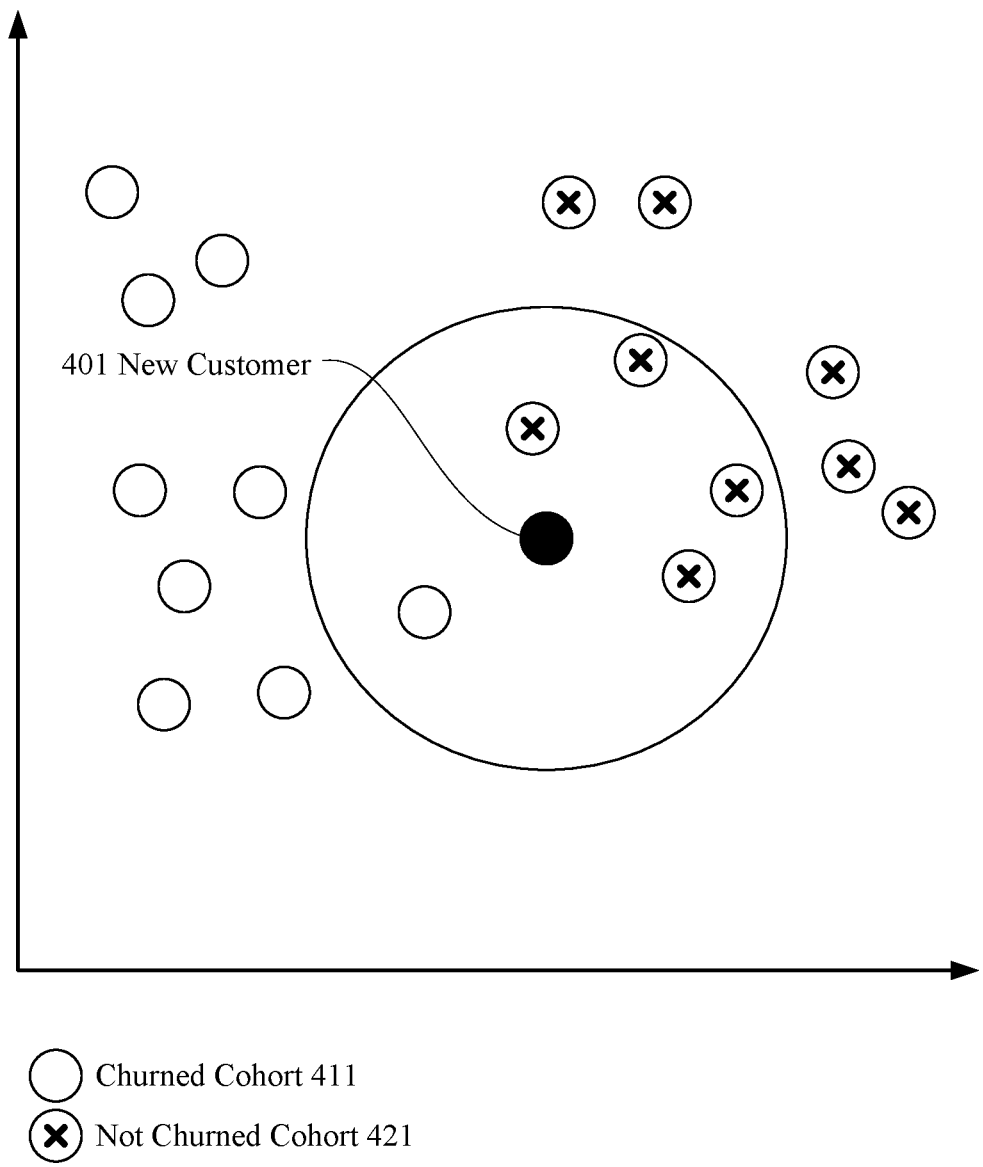
FIG. 4 is an example 400 of how cohorts of churned 411 and not churned 421 customers will be utilized to predict the likelihood of churn for new customers 401.

FIG. 4 400 shows an example of a new customer whose proximity with multiple cohorts, and hence his similarity to each customer within those cohorts, determines his churn risk. The circle around the customer illustrates an example of how the neighbors of the customer across all clusters will help to determine his churn risk. His characteristics are closer to that of the churned group in this example and he will likely be flagged as high risk.

1. Churned cohort 411: This is a pre-existing cohort of customers that have been clustered in a group and have also churned (as evident from training data) by one of the clustering algorithms. Note that not all of the customers within a cluster belong to the churned group.
2. Not Churned cohort 421: This is a pre-existing cohort of customers that have been clustered in a group and have also not churned (as evident from training data) by one of the clustering algorithms. Note that not all of the customers within a cluster belong to the not churned group.
3. New Customer 401: A patron who is not part of the original training set and whose churn risk is to be determined based on his Social Media Profile 312 and his Influencers Related Contents 311.

Figure 5:
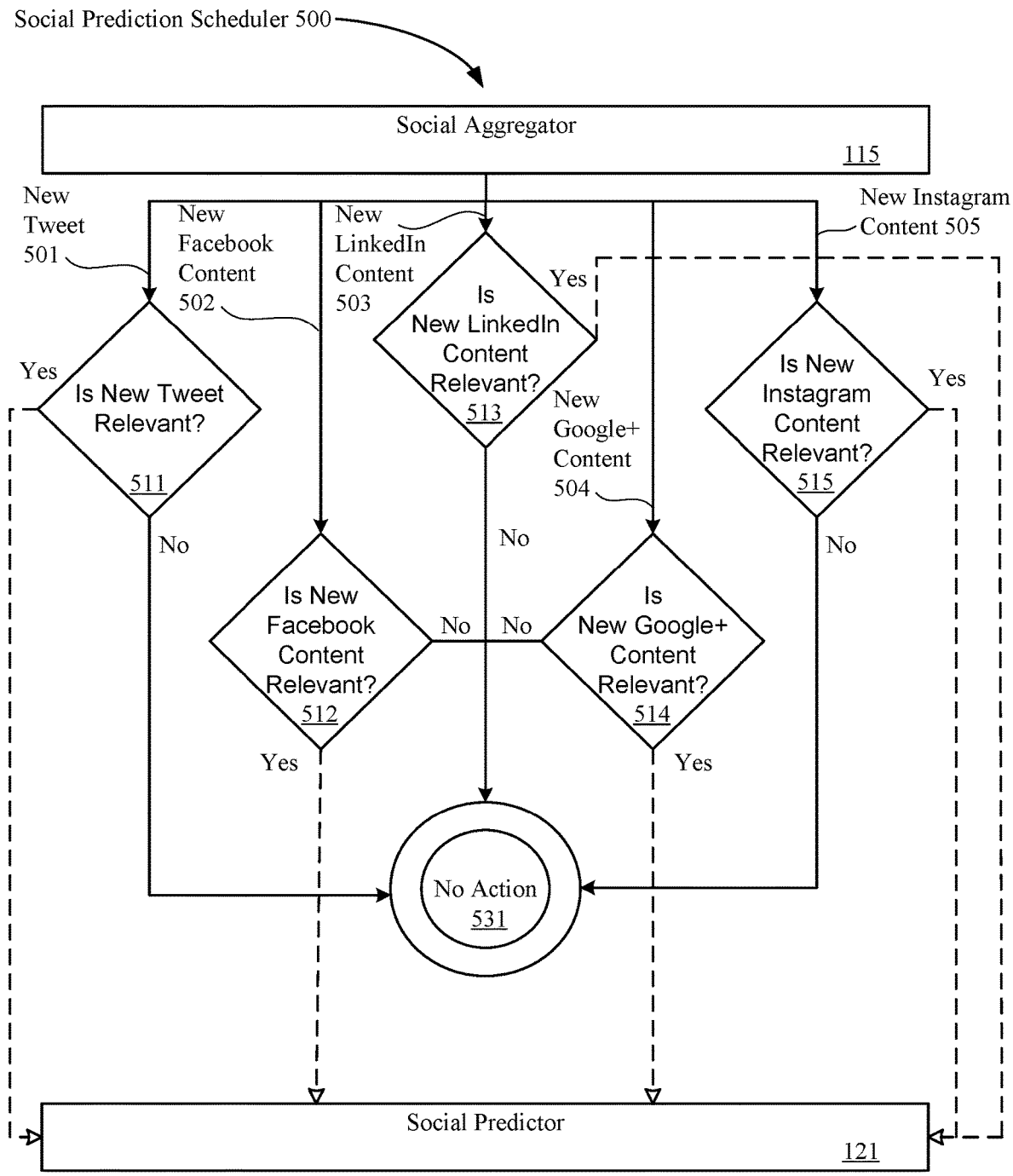
FIG. 5 is a flow chart 500 of how the Social Predictor Scheduler 122 triggers a computation of churn risk on the condition that the generated social media contents are relevant.

FIG. 5 500 demonstrates how the Social Prediction Scheduler subcomponent 112 works with Social Aggregator 115 and Social Predictor 121 to filter out the contents that are not going to affect churn risk but trigger a re-prediction when relevant social media content is generated.
1. New Tweet 521: Including but not limited to new tweets, or other TWITTER actions such as following, being followed, and retweeting.
2. New FACEBOOK Content 522: Including but not limited to new or updated posts, friending, commenting, and liking.
3. New LINKEDIN Content 523: Including but not limited to new or updated posts, following, commenting, and liking.
4. New GOOGLE+ Content 524: Including but not limited to new or updated posts, adding to circles, commenting, and liking.
5. New INSTAGRAM Content 525: Including but not limited to new or updated photos, friending, commenting, and liking.
6. Is New Tweet Relevant? 511: Determines if New Tweet 521 is relevant for computing churn risk. If it is, a request is sent to Social Predictor 121 to recompute the churn risk for that particular customer. Otherwise, no action 531 is taken.
7. Is New FACEBOOK Content Relevant? 512: Determines if the new FACEBOOK content 522 is relevant for computing churn risk. If it is, a request is sent to Social Predictor 121 to recompute the churn risk for that particular customer. Otherwise, no action 531 is taken.
8. Is New LINKEDIN Content Relevant? 513: Determines if the new LINKEDIN content 523 is relevant for computing churn risk. If it is, a request is sent to Social Predictor 121 to recompute the churn risk for that particular customer. Otherwise, no action 531 is taken.
9. Is New GOOGLE+ Content Relevant? 514: Determines if the new GOOGLE+ content 524 is relevant for computing churn risk. If it is, a request is sent to Social Predictor 121 to recompute the churn risk for that particular customer. Otherwise, no action 531 is taken.
10. Is New INSTAGRAM Content Relevant? 515: Determines if the new INSTAGRAM content 525 is relevant for computing churn risk. If it is, a request is sent to Social Predictor 121 to recompute the churn risk for that particular customer. Otherwise, no action 531 is taken.

Figure 6:
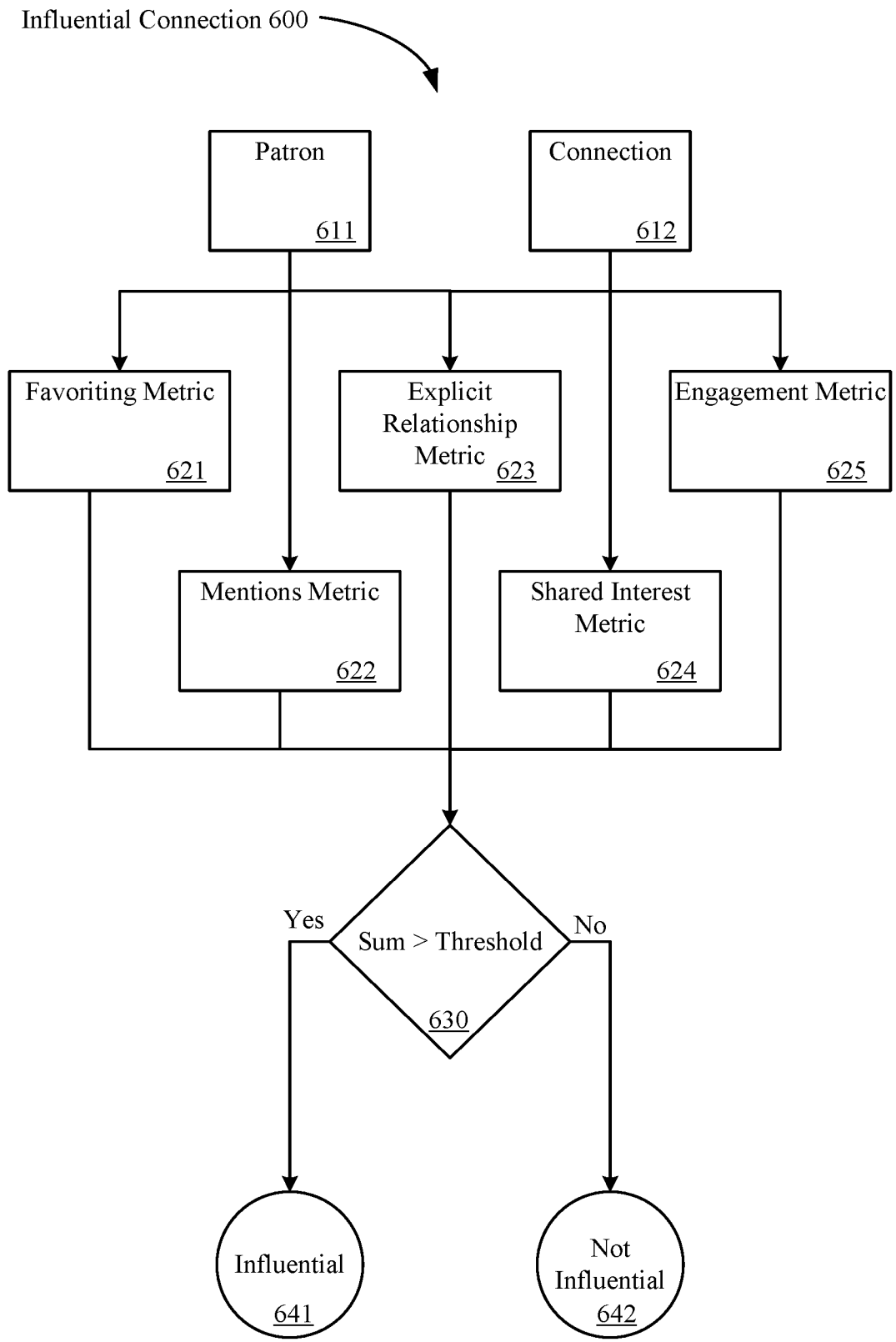
FIG. 6 is a flow chart 600 of how influential connections 641 in the social network of a customer 611 are determined.

FIG. 6 600 is a flow chart of how influential connections 641 in the social network of a customer 611 are determined. The influential connections are also called "first circle" and non-influential connections are named "second circle" in parts of the present invention. Multiple metrics are computed for each pair of customer and customer connection. The metrics participate in a weighted addition and the result of that addition goes through a threshold to decide if that connection is in first circle or not.
1. Patron 611: This represents the SMP of the customer whose connections need to be partitioned into influential and not influential groups.
2. Connection 612: This is the individual connection who is to be placed in either a first or second circle.
3. Favoriting Metric 621: This metric captures the actions that can be translated as favoriting particular contents from a connection. For example, "liking" a photo or a post in FACEBOOK is a favoriting action. A higher number of favoriting of a connection leads to a higher favoriting metric for that connection.
4. Mentions Metric 622: This metric captures the mentions of a connection on the social media platform from the customer. For example, tagging a connection in a photo is a mention, tagging someone in a tweet is also a mention. A higher number of mentions of a connection leads to a higher mention metric for that connection.
5. Explicit Relationship Metric 623: This metric captures the explicit relationships that some social media platforms provide. For example, a "sister" relationship or "married" relationship in FACEBOOK is a form of explicit relationship. Each kind of relationship has its own weight in the present invention. For example, "married" leads to a higher score than "cousin".
6. Shared Interest Metric 624: This metric captures the commons interests between a customer and his connection. Following the same company on LINKEDIN is an example of a shared interest. Liking the same FACEBOOK page is another example. A higher number of commons interests leads to a higher shared interest metric.
7. Engagement Metric 625: This metric captures the level of engagement between a customer and his connection. Commenting on a connection's photo is considered a single engagement for instance. Being tagged in the same photo is another example. A higher number of engagements leads to a higher engagement metric.
8. Sum Threshold 630: All the above metrics participate in a weighted sum. All sums above a certain threshold will place the connection 612 in the influential circle 641 and the rest will belong to not influential 642.
9. Influential 641: This is the influential group (i.e. first circle). All connections above the threshold 630 will be placed in this group.
10. Not Influential 642: This is the not influential group (i.e. second circle). All connections below or equal to the threshold 630 will be placed in this group.

FIG. 7 700 is a depiction of a console where customer retention agents would be able to view a queue of churn risk signals.

Figure 8C:
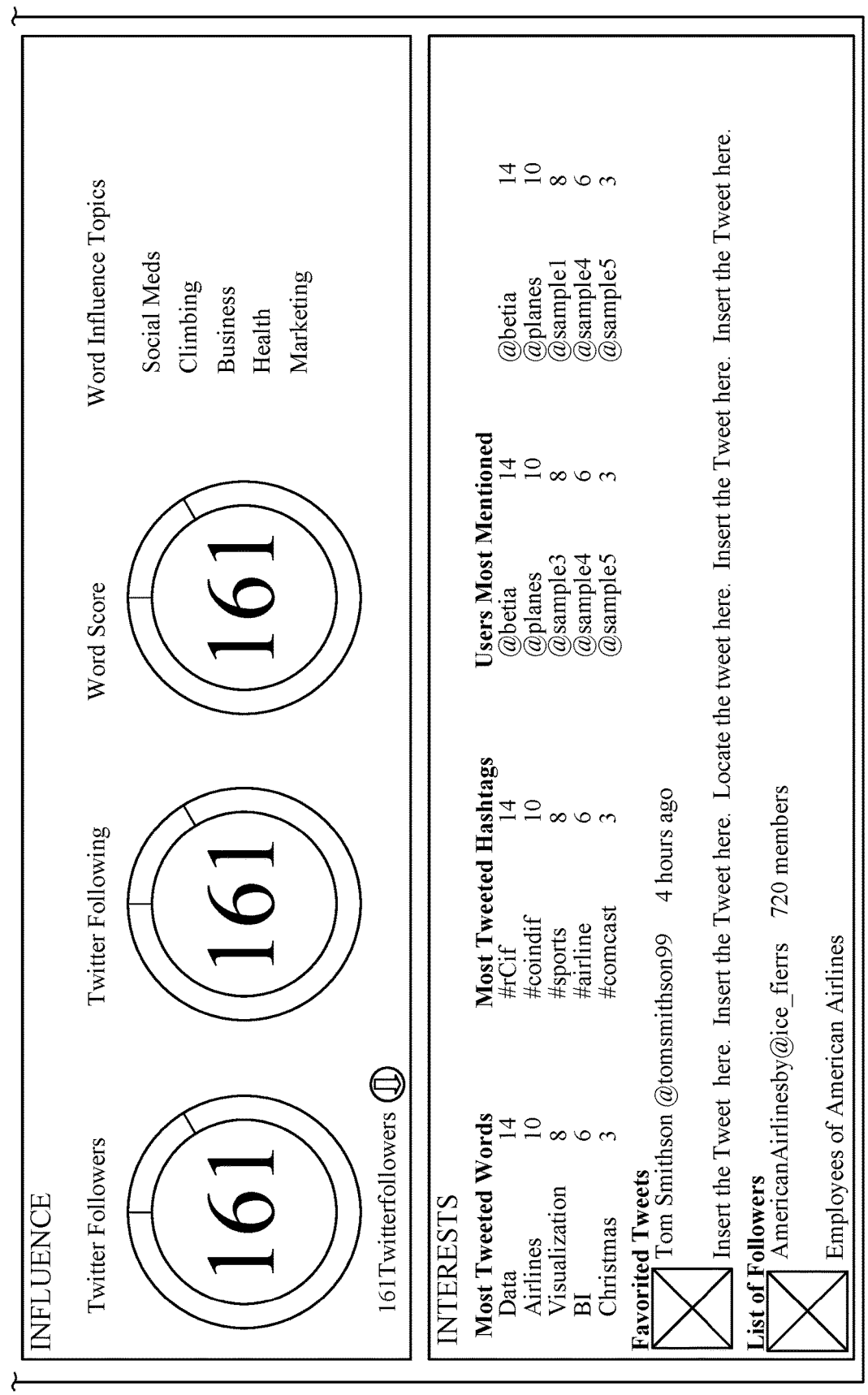
FIG. 8 is a depiction 800 of a page where customer retention agents would view details about a customer including the insights that contributed to their churn risk assessment.

FIG. 8 800 is a depiction of a page where customer retention agents would be able to view additional details about a customer including the insights that contributed to their churn risk assessment.

The present invention provides a non-transitory, tangible computer-readable medium storing instructions adapted to be executed by a computer processor to perform a method for generating a customer churn prediction, for an entity in need of such prediction, said method comprising the steps of: extracting and receiving, by a churn prediction program executing on the computer processor, a variety of social media inputs; pre-processing the social media inputs to identify relevant social media posts, data trends and social network structures (pre-processed data); extracting and engineering features of the pre-processed data, such features comprising at least one of i) assessed social media postings, ii) assessed life events, iii) assessed engagement with the entity and competitors of said entity iv) assessed trend predisposition of customers to the entity based upon their prior churns, v) assessed one or more communities of customers to the entity and predisposition of the customers to the entity to churn based upon churn risk of the one or more communities; create feature vectors based at least upon i) to v); aggregating feature vectors into a database and creating churn model in the processor (churn model of aggregated features); determining, by the churn prediction program executing on the computer processor, predicted churn behavior of any one customer to the entity based upon, the comparison of at least one feature vector of the any one customer to the churn model of aggregated features.

The present invention further provides computer architecture and system to support the implementation of the methods described and claimed herein. In regards to the system, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Particular embodiments may operate in a wide area network environment, such as the Internet, including multiple network addressable systems. The system of the invention may operate in a network environment, in which various example embodiments may operate. For example, a network cloud generally represents one or more interconnected networks, over which the systems and hosts described herein can communicate. Network cloud may include packet-based wide area networks (such as the Internet), private networks, wireless networks, satellite networks, cellular networks, paging networks, and the like.

Networking system is a network addressable system that, in various example embodiments, comprises one or more physical servers and data stores. The one or more physical servers may be operably connected to computer network via, by way of example, a set of routers and/or networking switches. In an example embodiment, the functionality hosted by the one or more physical servers may include web or HTTP servers, FTP servers, as well as, without limitation, webpages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), Flash, ActionScript, and the like.

Physical servers may host functionality directed to the operations of the networking system. The data store may store content and data relating to, and enabling, operation of networking system as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects, podcasts, etc. Logically, the data store corresponds to one or more of a variety of separate and integrated databases, such as relational databases and object-oriented databases, that maintain information as an integrated collection of logically related records or files stored on one or more physical systems. Structurally, the data store may generally include one or more of a large class of data storage and management systems. In particular embodiments, the data store may be implemented by any suitable physical system(s) including components, such as one or more database servers, mass storage media, media library systems, storage area networks, data storage clouds, and the like. In one example embodiment, the data store includes one or more servers, databases (e.g., MySQL), and/or data warehouses. As is readily apparent herein, the data store may include data associated with different networking systems, users and/or commercial entity (client) systems.

It is to be understood that churn rate measures a number of individuals (for example, customer, clients, subscribers) that leave a group or other collection over a certain period of time. A relevant example is the number of customers that leave a subscription-based service. Churn, therefore, is similar to attrition, and may be the opposite of retention. For example, a subscriber-based service model may succeed when subscriber churn is low (and retention is high), and may fail when subscriber churn is high (and retention is low), among other things.

Industries that rely on subscription-based service models, such as the cable television industry, the cell phone industry, web-based services, retail banking and insurance and so on, spend a considerable amount of time, money, and effort attempting to identify reasons why their customers churn, in order to provide retention incentives to customers that keep them from ending use of provided services. However, their efforts often lack insight or are driven by information received directly from customers or from simple metrics, which may lead to ineffective results and unsuccessful determinations as to why customers are not being retained, among other problems. Within the scope of this disclosure, entities and commercial clients, service providers and clients may be used interchangeably. Subscribers/customers are generally referring to those individuals who use the services of the entities, service providers and commercial clients and are the targets of the churn tracking methods described herein. So, the present disclosure describes methods, systems, and computer program products, which individually provide functionality for reducing a churn rate for service providers, such as by determining churn probabilities for subscribers/customers and/or other members of those service providers.

Churn prediction and tracking system of the invention is generally a computer or computing device including functionality for communicating (e.g., remotely) over a computer network. Churn prediction and tracking system may be a desktop computer, laptop computer, personal digital assistant (PDA), in- or out-of-car navigation system, smart phone or other cellular or mobile phone, or mobile gaming device, among other suitable computing devices. Churn prediction and tracking system may execute one or more applications, such as a web browser (e.g., Microsoft Internet Explorer, Mozilla Firefox, Apple Safari, GOOGLE CHROME, and Opera), to access and view content over a computer network.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to entities/commercial clients/service providers/clients as a static document; however, through the use of web elements embedded in the page, an interactive experience may be achieved with the page or a sequence of pages.

The elements of one hardware system for use within the method of the invention is described in greater detail below. In particular, network interface provides communication between hardware system and any of a wide range of networks, such as an Ethernet (e.g., IEEE 802.3) network, a backplane, etc. Mass storage provides permanent storage for the data and programming instructions to perform the above-described functions implemented in servers, whereas system memory (e.g., DRAM) provides temporary storage for the data and programming instructions when executed by processor. I/O ports are one or more serial and/or parallel communication ports that provide communication between additional peripheral devices, which may be coupled to hardware system.

Hardware system may include a variety of system architectures and various components of hardware system may be rearranged. For example, cache may be on-chip with processor. Alternatively, cache and processor may be packed together as a "processor module," with processor being referred to as the "processor core." Furthermore, certain embodiments of the present disclosure may not require nor include all of the above components. For example, the peripheral devices shown coupled to standard I/O bus may couple to high performance I/O bus. In addition, in some embodiments, only a single bus may exist, with the components of hardware system being coupled to the single bus. Furthermore, hardware system may include additional components, such as additional processors, storage devices, or memories.

An operating system manages and controls the operation of hardware system, including the input and output of data to and from software applications. The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit.

General Architecture of the Social Predictor Engine

Figure 9:
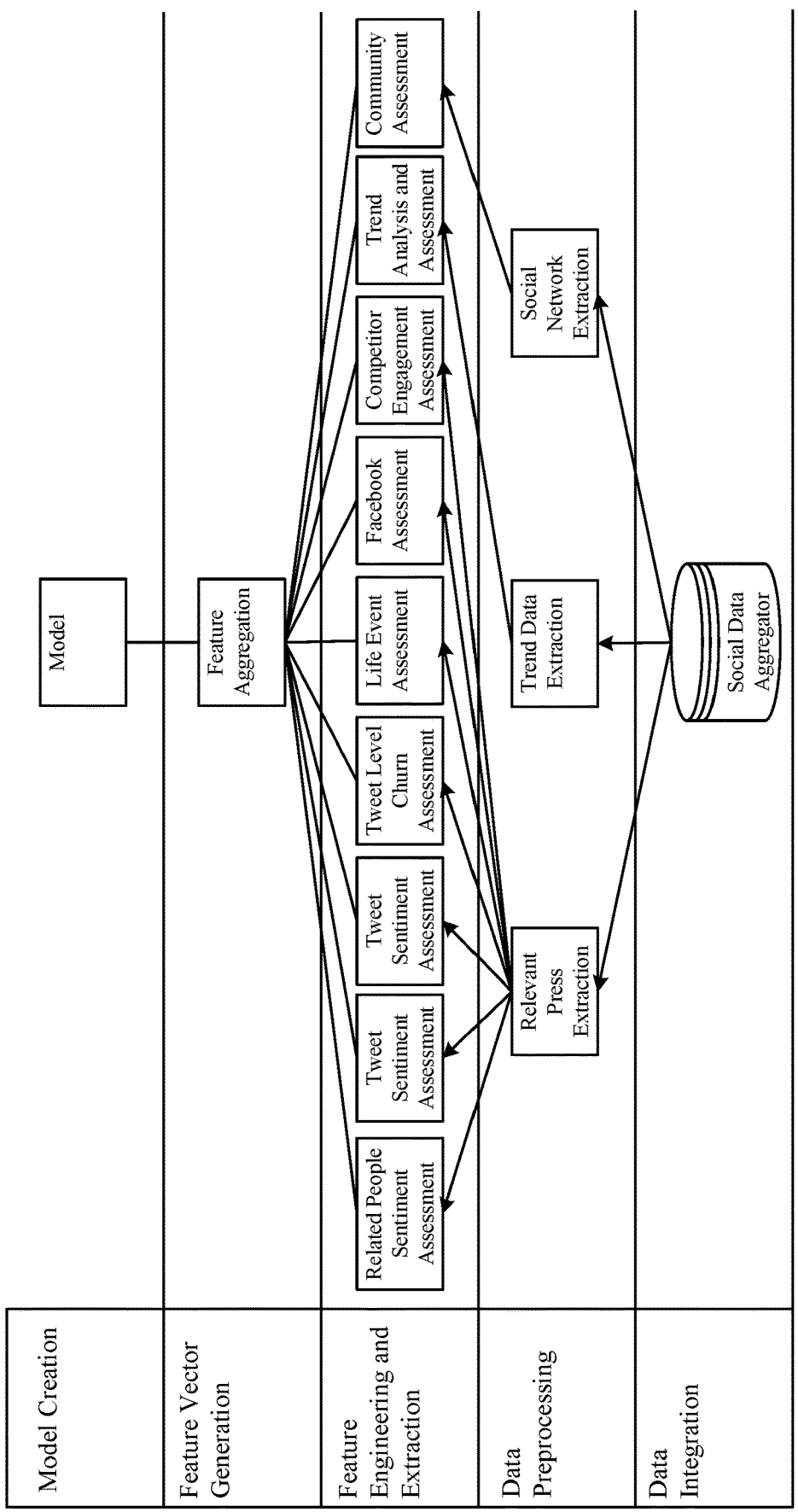
FIG. 9 is a flow chart of the general architecture of the data integration, preprocessing, feature engineering and extraction, feature vector generation and model generation.

In FIG. 9, the general architecture of the data pipeline of a preferred aspect of the social predictor engine in this invention is shown. The social predictor engine extracts patterns that are used for predicting the churn probability of customers, from different sources of social data, for example, TWITTER. The integrated data is provided to the social predictor engine by the social aggregator. This data is raw and is preprocessed to be used by the other components in the higher levels of the data pipeline. The extracted patterns are based on selected cues or features which are calculated based on data per customer. These features may be based on both the behavior of the user or the network. For example the sentiment based features calculate some features that are indicated by each user's behavior, while network based features capture these indications from the network and calculate their impact on the churn probability of each user. Finally a machine learning model, which is essentially an estimation of real behavior of users, is trained based on the different features, calculated to capture different aspects of user's behavior. In this aspect, there are preferably five layers in this pipeline as follows:

1.1 Data Integration

This is the layer responsible for streaming, requesting and extracting data from different social network APIs. This layer stores data and exposes data through a REST API. The main components of this layer are the Social Aggregator and the Social Provider. The Social Aggregator contains multiple long running processes which tap into the corresponding social network's streaming APIs in a real-time manner. As some social networks only provide REST APIs, the Social Aggregator is also capable of polling data from a REST API. Data then is stored in highly available databases, and exposed to the other parts of the system via load balanced REST APIs.

1.2 Data Preprocessing

This layer is responsible for pre-processing the data received from the Social Data Aggregator. This pre-processing is mainly to extract relevant data from the raw data received from Data Integration Layer and to properly format this data for passing to the next layer. Different types of pre-processing may be employed based on the features that are going to be extracted on the next layer. Three main pre-processing components in this layer may be: Relevant Post Extraction, Trend Data Extraction, and Social Network Structure Extraction.

1.2.1 Relevant Post Extraction

A major role of this step is to extract relevant social media inputs or posts (for example, Tweets) from raw data. This step uses a manually designed lexicon to estimate relevancy of each single post to telecom domain. In this lexion there are a set of words and a relevancy score it attributed to each term. The relevancy of each post is calculated based on below formula:

$$\text{relevancy}(T) = \sum_{t \in T \cap L} \text{score}(t)/N$$

T is the set of terms in each Post and L is the set of terms in the lexicon and N is the length of the post. The score function returns the relevancy scores based on the lexicon. If the relevancy score of a post is greater than a selected threshold, it is considered as a "relevant" one. The threshold varies and can be adapted, case by case, to achieve the best results in a cross-validation method.

Data may be appended to each post to tag the existence of keywords which relate that post to a target company or its competitors. The BrandTagger component tags the relevant terms in a post. BrandTagger essentially looks for the terms related to the target company identities and their variants. Target companies are both the current company of a user and its competitive companies. For example if the current company of a user is 'wind' it will look for 'windmobile', 'Wind', 'Wind company' and so on. This component has an API to check if an input text contains a specific company or its competitor brands, social media IDs, and other similar company related identities. This information will be used subsequently in calculating features. It is preferred that only essential metadata, like the userID or createdTime and retained and the other irrelevant metadata will be removed prior to passing to the next level. The preprocessed data is written to file (or can be passed directly) for being used by next layer.

1.2.2 Trend Data Extraction

In this step, data is reformatted to be used for trend analysis over the social media data. Relevant pieces of information that are changing during time are extracted. Examples include changes in membership in groups, changes in following/unfollowing friends or companies, changes in number of followers, changes in posting behavior, changes in user's activity in a social media and so on. The changes could be related to a specific user or the behavioral changes in the whole network that can indicate current user behavioral trends. The formatted data is passed to the next layer for feature extraction.

1.2.3 Social Network Structure Extraction

Information is extracted regarding the structure of social network for a customer/user/subscriber. Namely in this step, relevant data is extracted for recreating the surrounding network of the customer/subscriber/user.

1.3 Feature Engineering and Extraction

This layer comprises a plurality of steps, each of which serves to extract the features based on the previously preprocessed data. Each step is designed to extract a different type of feature.

1.3.1 Tweet Sentiment Assessment:

An important set of features, usable in the churn analysis of the present invention, are based on a "sentiment" of each company's customers tweets. This component uses, preferably, three sources for assessing the sentiment of related tweets. Using a third package is preferred for tie breaking and for fusion of the three sentiments.

A feature extraction module the assessed data and extracts proper features based on the sentiments. Table 1 shows a list of such features and their descriptions.

TABLE 1

| Feature Name | Description |
| --- | --- |
| num_sign_mean_sentiment_pos_B1_C1 | number of tweets containing positive sentiments towards both company's brand and the competitor brands |
| num_sign_mean_sentiment_pos_B1_C0 | number of tweets containing positive sentiments towards company's brand and not the competitor brands |
| num_sign_mean_sentiment_pos_B0_C1 | number of tweets containing positive sentiments towards not the company's brand but the competitor brands |
| num_sign_mean_sentiment_pos_B0_C0 | number of tweets containing positive sentiments towards neither of company's brand nor the competitor brands |
| num_sign_mean_sentiment_neg_B1_C1 | number of tweets containing negative sentiments towards both company's brand and the competitor brands |
| num_sign_mean_sentiment_neg_B1_C0 | number of tweets containing negative sentiments towards company's brand and not the competitor brands |
| num_sign_mean_sentiment_neg_B0_C1 | number of tweets containing negative sentiments towards not the company's brand but the competitor brands |
| num_sign_mean_sentiment_neg_B0_C0 | number of tweets containing negative sentiments towards neither of company's brand nor the competitor brands |
| num_sign_mean_sentiment_nutral_B1_C1 | number of tweets containing neutral sentiments towards both company's brand and the competitor brands |
| num_sign_mean_sentiment_nutral_B1_C0 | number of tweets containing neutral sentiments towards company's brand and not the competitor brands |
| num_sign_mean_sentiment_nutral_B0_C1 | number of tweets containing neutral sentiments towards not the company's brand but the competitor brands |
| num_sign_mean_sentiment_nutral_B0_C0 | number of tweets containing neutral sentiments towards neither of company's brand nor the competitor brands |
| max_sentiment_mean_B1_C0 | max of tweet sentiment values (each sentiment value is the mean of three sentiment analysers) toward company and not the competitors brands |
| min_sentiment_mean_B1_C0 | min of tweet sentiment values (each sentiment value is the mean of three sentiment analysers) toward company and not the competitors brands |
| mean_sentiment_mean_B1_C0 | mean of tweet sentiment values (each sentiment value is the mean of three sentiment analysers) toward company and not the competitors brands |
| max_sentiment_mean_B0_C1 | max of tweet sentiment values (each sentiment value is the mean of three sentiment analysers) toward not the company and but the competitors brands |
| min_sentiment_mean_B0_C1 | min of tweet sentiment values (each |

TABLE 1-continued

| Feature Name | Description |
| --- | --- |
| | sentiment value is the mean of three sentiment analysers) toward not the company and but the competitors brands |
| mean_sentiment_mean_B0_C1 | mean of tweet sentiment values (each sentiment value is the mean of three sentiment analysers) toward not the company and but the competitors brands |
| max_sentiment_mean_B1_C1 | max of tweet sentiment values (each sentiment value is the mean of three sentiment analysers) toward both the company and the competitors brands |
| min_sentiment_mean_B1_C1 | min of tweet sentiment values (each sentiment value is the mean of three sentiment analysers) toward both the company and the competitors brands |
| mean_sentiment_mean_B1_C1 | mean of tweet sentiment values (each sentiment value is the mean of three sentiment analysers) toward both the company and the competitors brands |
| max_sentiment_mean_B0_C0 | max of tweet sentiment values (each sentiment value is the mean of three sentiment analysers) toward neither the company nor the competitors brands |
| min_sentiment_mean_B0_C0 | min of tweet sentiment values (each sentiment value is the mean of three sentiment analysers) toward neither the company nor the competitors brands |
| mean_sentiment_mean_B0_C0 | mean of tweet sentiment values (each sentiment value is the mean of three sentiment analysers) toward neither the company nor the competitors brands |
| max_sentiment_max_B1_C0 | max of tweet sentiment values (each sentiment value is the max of three sentiment analysers) toward company and not the competitors brands |
| min_sentiment_max_B1_C0 | min of tweet sentiment values (each sentiment value is the max of three sentiment analysers) toward company and not the competitors brands |
| mean_sentiment_max_B1_C0 | mean of tweet sentiment values (each sentiment value is the max of three sentiment analysers) toward company and not the competitors brands |
| max_sentiment_max_B0_C1 | max of tweet sentiment values (each sentiment value is the max of three sentiment analysers) toward not the company and but the competitors brands |
| min_sentiment_max_B0_C1 | min of tweet sentiment values (each sentiment value is the max of three sentiment analysers) toward not the company and but the competitors brands |
| mean_sentiment_max_B0_C1 | mean of tweet sentiment values (each sentiment value is the max of three sentiment analysers) toward not the company and but the competitors brands |
| max_sentiment_max_B1_C1 | max of tweet sentiment values (each sentiment value is the max of three sentiment analysers) toward both the company and the competitors brands |
| min_sentiment_max_B1_C1 | min of tweet sentiment values (each sentiment value is the max of three sentiment analysers) toward both the company and the competitors brands |
| mean_sentiment_max_B1_C1 | mean of tweet sentiment values (each sentiment value is the max of three sentiment analysers) toward both the company and the competitors brands |
| max_sentiment_max_B0_C0 | max of tweet sentiment values (each sentiment value is the max of three sentiment analysers) toward neither the company nor the competitors brands |
| min_sentiment_max_B0_C0 | min of tweet sentiment values (each sentiment value is the max of three sentiment analysers) toward neither the company nor the competitors brands |
| mean_sentiment_max_B0_C0 | mean of tweet sentiment values (each |

TABLE 1-continued

| Feature Name | Description |
|---|---|
| | sentiment value is the max of three sentiment analysers) toward neither the company nor the competitors brands |
| max_sentiment_min_B1_C0 | max of tweet sentiment values (each sentiment value is the min of three sentiment analysers) toward company and not the competitors brands |
| min_sentiment_min_B1_C0 | min of tweet sentiment values (each sentiment value is the min of three sentiment analysers) toward company and not the competitors brands |
| mean_sentiment_min_B1_C0 | mean of tweet sentiment values (each sentiment value is the min of three sentiment analysers) toward company and not the competitors brands |
| max_sentiment_min_B0_C1 | max of tweet sentiment values (each sentiment value is the min of three sentiment analysers) toward not the company and but the competitors brands |
| min_sentiment_min_B0_C1 | min of tweet sentiment values (each sentiment value is the min of three sentiment analysers) toward not the company and but the competitors brands |
| mean_sentiment_min_B0_C1 | mean of tweet sentiment values (each sentiment value is the min of three sentiment analysers) toward not the company and but the competitors brands |
| max_sentiment_min_B1_C1 | max of tweet sentiment values (each sentiment value is the min of three sentiment analysers) toward both the company and the competitors brands |
| min_sentiment_min_B1_C1 | min of tweet sentiment values (each sentiment value is the min of three sentiment analysers) toward both the company and the competitors brands |
| mean_sentiment_min_B1_C1 | mean of tweet sentiment values (each sentiment value is the min of three sentiment analysers) toward both the company and the competitors brands |
| max_sentiment_min_B0_C0 | max of tweet sentiment values (each sentiment value is the min of three sentiment analysers) toward neither the company nor the competitors brands |
| min_sentiment_min_B0_C0 | min of tweet sentiment values (each sentiment value is the min of three sentiment analysers) toward neither the company nor the competitors brands |
| mean_sentiment_min_B0_C0 | mean of tweet sentiment values (each sentiment value is the min of three sentiment analysers) toward neither the company nor the competitors brands |

1.3.2 Tweet Churn Level Assessment:

Another feature is based on tweet level churn assessment. This feature may be considered as a subclass of sentiment based features, with a goal being the detection of signals of churn at a tweet level. TweetChurnLevelAssessment is a proxy script that uses a package for identifying these signals based on bag of words model.

1.3.3 Related People Sentiment Assessment

From the extracted relevant posts, the sentiment of "related people" is assessed for aggregation. For example, in one aspect, the sentiments of 1-10 related people are assessed using the features listed in Table 1.

1.3.4 FACEBOOK Sentiment Assessment

This step is similar to tweet sentiment assessment component, described above. The only difference is that it uses the FACEBOOK data for assessment and extracting features.

1.3.5 Life Event Assessment

Another set of features which may be extracted and aggregated relates to life events. Events are selected and extracted from user posts in social media using, for example, a machine learning model. A plurality of life events may be searched for and used, including, but not limited to moving, going to college, getting married, leaving a job and starting a new job. The selected extracted events may be used to calculate a set of features given in Table 2.

TABLE 2

| Feature Name | Description |
|---|---|
| mv_evntl1 | number of moving events in the first most recent month |
| mv_evntl2 | number of moving events in the second most recent month |
| mv_evntl3 | number of moving events in the third most recent month |

TABLE 2-continued

| Feature Name | Description |
|---|---|
| mv_evnt\|4 | number of moving events in the fourth most recent month |
| mv_evnt\|5 | number of moving events in the fifth most recent month |
| co_evnt\|1 | number of college events in the first most recent month |
| co_evnt\|2 | number of college events in the second most recent month |
| co_evnt\|3 | number of college events in the third most recent month |
| co_evnt\|4 | number of college events in the fourth most recent month |
| co_evnt\|5 | number of college events in the fifth most recent month |
| wd_evnt\|1 | number of wedding events in the first most recent month |
| wd_evnt\|2 | number of wedding events in the second most recent month |
| wd_evnt\|3 | number of wedding events in the third most recent month |
| wd_evnt\|4 | number of wedding events in the fourth most recent month |
| wd_evnt\|5 | number of wedding events in the fifth most recent month |
| ej_evnt\|1 | number of exit from job events in the first most recent month |
| ej_evnt\|2 | number of exit from job events in the second most recent month |
| ej_evnt\|3 | number of exit from job events in the third most recent month |
| ej_evnt\|4 | number of exit from job events in the fourth most recent month |
| ej_evnt\|5 | number of exit from job events in the fifth most recent month |
| nj_evnt\|1 | number of new job events in the first most recent month |
| nj_evnt\|2 | number of new job events in the second most recent month |
| nj_evnt\|3 | number of new job events in the third most recent month |
| nj_evnt\|4 | number of new job events in the fourth most recent month |
| nj_evnt\|5 | number of new job events in the fifth most recent month |
| ratio_mv_evnt\|1 | ratio to all tweets in corresponding month for moving events in the first most recent month |
| ratio_mv_evnt\|2 | ratio to all tweets in corresponding month for moving events in the second most recent month |
| ratio_mv_evnt\|3 | ratio to all tweets in corresponding month for moving events in the third most recent month |
| ratio_mv_evnt\|4 | ratio to all tweets in corresponding month for moving events in the fourth most recent month |
| ratio_mv_evnt\|5 | ratio to all tweets in corresponding month for moving events in the fifth most recent month |
| ratio_co_evnt\|1 | ratio to all tweets in corresponding month for college events in the first most recent month |
| ratio_co_evnt\|2 | ratio to all tweets in corresponding month for college events in the second most recent month |
| ratio_co_evnt\|3 | ratio to all tweets in corresponding month for college events in the third most recent month |
| ratio_co_evnt\|4 | ratio to all tweets in corresponding month for college events in the fourth most recent month |
| ratio_co_evnt\|5 | ratio to all tweets in corresponding month for college events in the fifth most recent month |
| ratio_wd_evnt\|1 | ratio to all tweets in corresponding month for wedding events in the first most recent month |
| ratio_wd_evnt\|2 | ratio to all tweets in corresponding month for wedding events in the second most recent month |
| ratio_wd_evnt\|3 | ratio to all tweets in corresponding month for wedding events in the third most recent month |
| ratio_wd_evnt\|4 | ratio to all tweets in corresponding month for wedding events in the fourth most recent month |
| ratio_wd_evnt\|5 | ratio to all tweets in corresponding month for wedding events in the fifth most recent month |
| ratio_ej_evnt\|1 | ratio to all tweets in corresponding month for exit from job events in the first most recent month |
| ratio_ej_evnt\|2 | ratio to all tweets in corresponding month for exit from job events in the second most recent month |
| ratio_ej_evnt\|3 | ratio to all tweets in corresponding month for exit from job events in the third most recent month |
| ratio_ej_evnt\|4 | ratio to all tweets in corresponding month for exit from job events in the fourth most recent month |
| ratio_ej_evnt\|5 | ratio to all tweets in corresponding month for exit from job events in the fifth most recent month |
| ratio_nj_evnt\|1 | ratio to all tweets in corresponding month for new job events in the first most recent month |
| ratio_nj_evnt\|2 | ratio to all tweets in corresponding month for new job events in the second most recent month |
| ratio_nj_evnt\|3 | ratio to all tweets in corresponding month for new job events in the third most recent month |
| ratio_nj_evnt\|4 | ratio to all tweets in corresponding month for new job events in the fourth most recent month |
| ratio_nj_evnt\|5 | ratio to all tweets in corresponding month for new job events in the fifth most recent month |

1.3.6 Company/Competitor Engagement Assessment

This step collects, analyzes and aggregates posts on a variety of social media platforms pages of a competitor or a target company (to the business or entity) to find evidence and frequencies of churn by the customer.

| Feature Name | Description |
| --- | --- |
| CompanyEnagementCount | How many times the company has reach/response to the customer in the past 6 months |
| CompetitorEnagementCount | How many times the competitors have reach/response to the customer in the past 6 months |

1.3.7 Trend Analysis and Assessment

In this step, temporal features which are necessary for analysing the trend of churn for a single user based upon his/her previous churn scores and also based on the overall trend of churn from the company are collected and assessed. Examples, of such features are presented in Table 3 below. These features are used for trend analysis and predicting the trend in a pre-determined/pre-selected time increment, for example in the following month.

TABLE 3

| Feature Name | Description |
| --- | --- |
| TemporalSingleChurnScore | The churn scores in past 12 months for each user for each month |
| TemporalOveralChurnScore | The mean churn score of users during past 12 month |
| TemporalGroupMemberShip | Changes in Membership of a user in groups during time |
| TemporalConnectionCount | changes in following/unfollowing friends or companies each month |
| TemporalPostCount | Changes in number of posts during each month (will reflect internet usage behavior) |

1.3.8 Community Assessment

A significant body of data relates to and can be extracted from the various communities to which a customer belongs. For example friends who work in the same place as a customer will be more likely to use or not use a specific subscription or service. Changes in the preferences and behaviors of members in a community directly affects others in that same community and the aggregation and analysis of that data is used in churn prediction. Based on the structural properties of a social network among the users, communities are detected and scored based on their churn risk. Such score is calculated based on the ratio of the number of users of a target company to the count of all members in this community. Features are then calculated based on membership of users to such communities.

| Feature Name | Description |
| --- | --- |
| CommunityMembershipCount | How many communities a person is a member of. |
| MeanCommunityMembershioChurnRisk | Calculated based on the mean of churn risk of the communities a users is a member. |

1.4 Feature Vector Generation

The different feature types for each user are combined together to create a single feature vector for each user. The outcome is a single feature vector per user as follow:

Feature Type: Sentiment Based

| userID | fs1 | fs2 | fs3 | fs4 | fs5 |
| --- | --- | --- | --- | --- | --- |
| 1 | .5 | .3 | 0 | 1 | .2 |
| 2 | .3 | .2 | −.2 | 1 | 0 |
| ... | ... | ... | ... | ... | ... |

Feature Type: Life Event Based

| userID | ft1 | ft2 | ft3 | tf4 |
| --- | --- | --- | --- | --- |
| 1 | .3 | .1 | .2 | 0 |
| 2 | .4 | 0 | .1 | 1 |

The combined feature vectors:

| userID | fs1 | fs2 | fs3 | fs4 | fs5 | ft1 | ft2 | ft3 | ft4 |
| --- | --- | --- | --- | --- | --- | --- | --- | --- | --- |
| 1 | .5 | .3 | 0 | 1 | .2 | .3 | .1 | .2 | 0 |
| 2 | .3 | .2 | −.2 | 1 | 0 | .4 | 0 | .1 | 1 |

By way of example, fs1 to fs5 could be related to semantic based features and ft1 to ft4 to life event based features. These features are calculated separately by different components in the assessment layer. However for training a machine learning model one feature vector per user, at least, is required. Therefore these separate feature vectors are combined to create a single feature vector. There is unique identifier key field like user ID which is considered to be preserved in the different featured vectors (coming from different assessment components). This key field is used for joining the feature vectors.

1.5 Model

Finally the model is built over the extracted features given by the below layer. Various different machine learning algorithms may be used for model building such as, for example, xgboost and random forest. Applying random forest, the implementation that is provided by sklearn package in python was used. Preferably, about 5000 trees are used in the model, preferably as deep as 50 levels. The height of trees shows the amount of interactions between features which can be captured by a tree. As it is preferred to have a relatively large set of features, comparing to sample size, using this interaction level, prevents side effect of co related features.

Life Event Components

One of the correlated concepts to subscriber/customer churn relates to life events, as noted above. Further detail on this aspect is provided herein and in FIG. 11. Life events are preferably significant trackable events that occur in individual's life. They could be something that happens in the personal life of someone such as getting married or they could be a professional circumstance such as starting a new job.

Capturing data relating to life event is an aspect of the churn prediction method of the invention as such life events can affect the customer behavior and might encourage or motivate him/her to switch their service providers. These events, properly tracked and engineered, can provide valuable insight into the churn prediction solution and hence life events metrics comprise an important part in a preferred method of the present invention. The life event workflow starts from collecting social data for each chosen life event, curating those events for each event type, using a machine learning solution to generate both probabilities of a life event for a single social content and also a binary result. These generated life event results are used to predict customer churn.

Table 4 is a list of non-limiting life events and a brief description of each used in the current invention.

TABLE 4

| Life Event Prediction Sub-component | Description |
| --- | --- |
| College | A component that predicts if a customer is going to start attending college in the near future by analyzing a single social content. |
| Marriage | A component that predicts if a customer is going to get married in the near future by analyzing a single social content. |
| Move | A component that predicts if a customer is going to start move to a new location in the near future by analyzing a single social content. |
| Travel | A component that predicts if a customer is going to travel in the near future by analyzing a single social content. |
| New Child | A component that predicts if a customer is going to have a child in the near future by analyzing a single social content. |
| New job | A component that predicts if a customer is going to start a new job in the near future by analyzing a single social content. |

Figure 10:
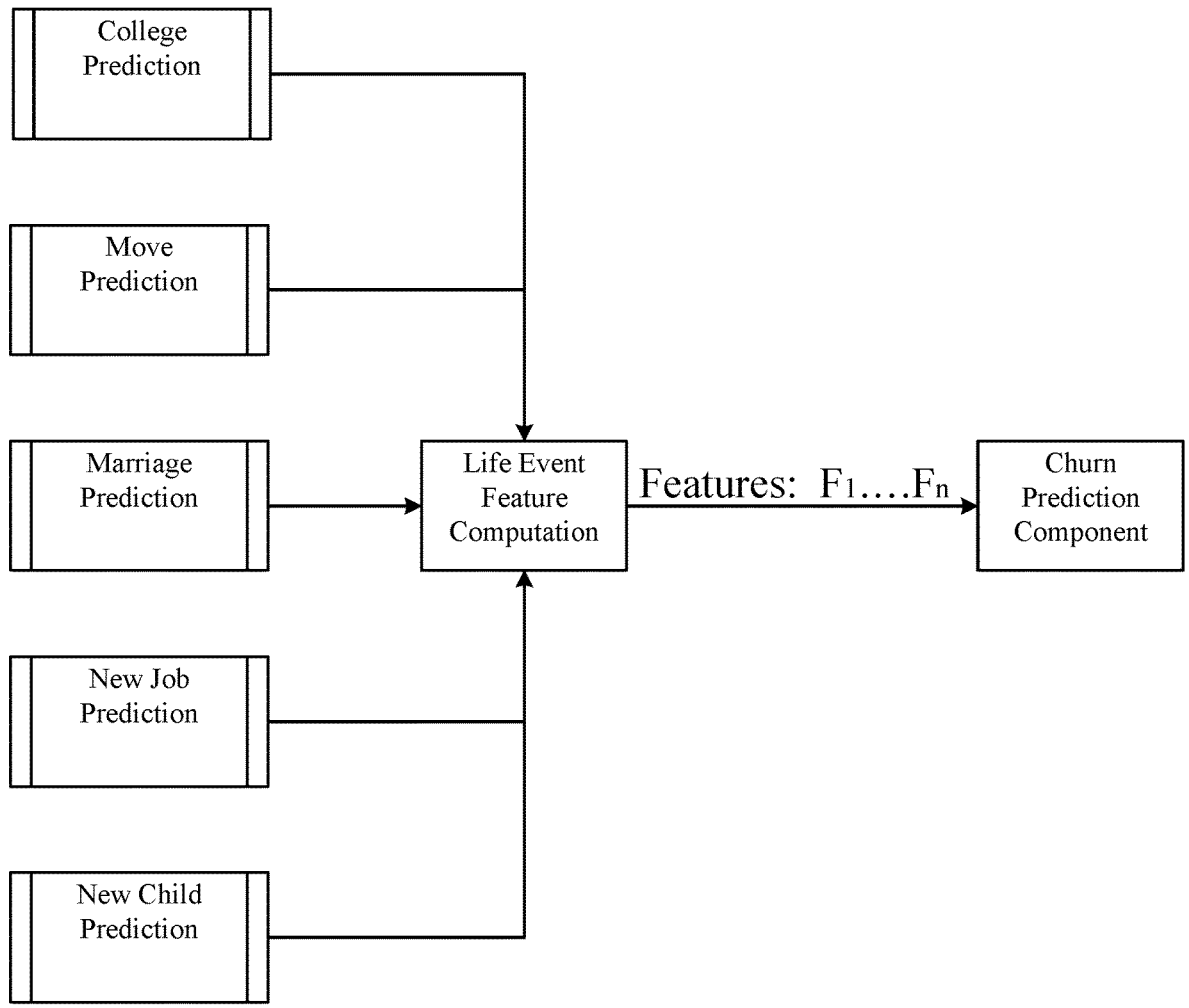
FIG. 10 is a flow chart of "life event participation" in churn prediction, in accordance with one aspect of method of the invention.
Figure 11:
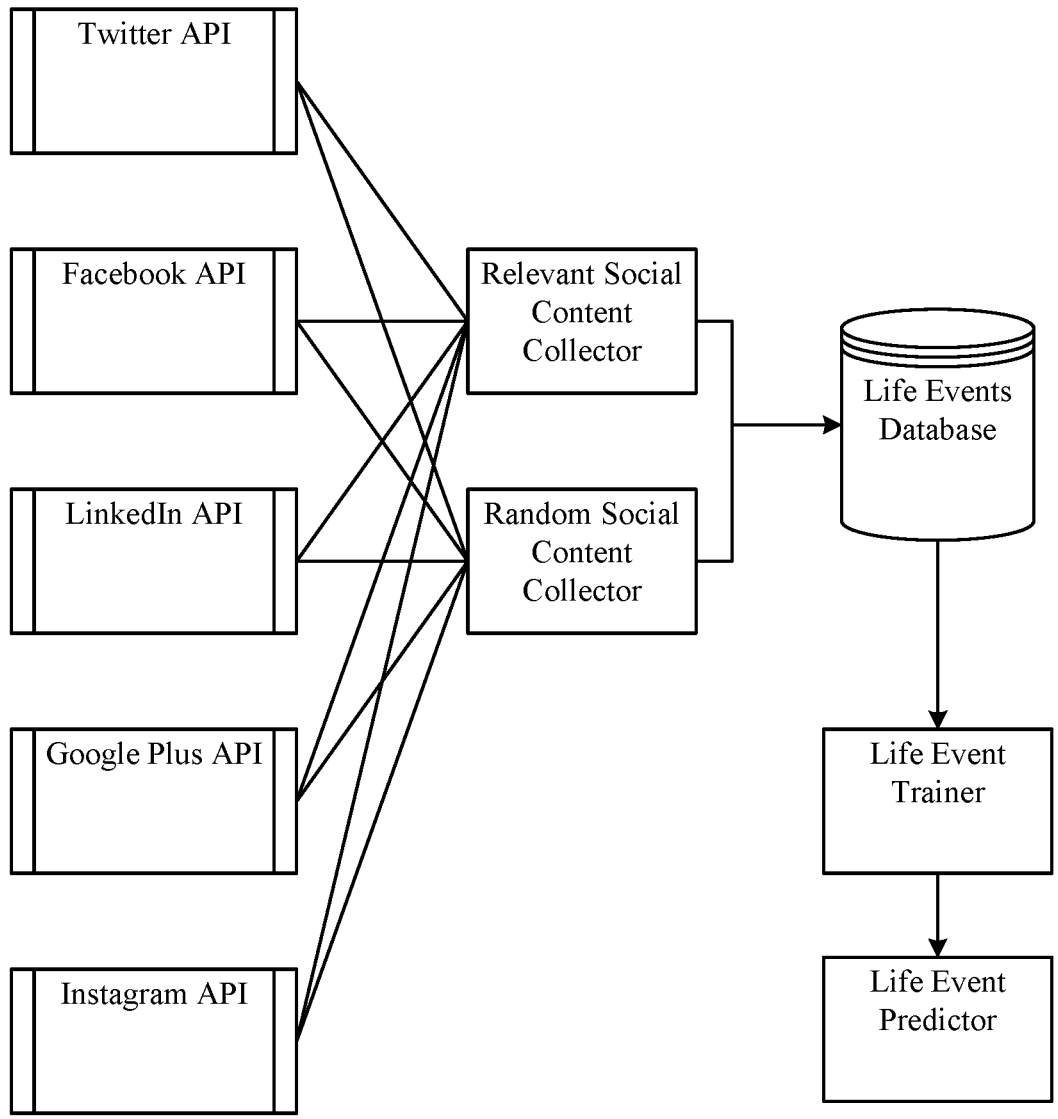
FIG. 11 is a schematic of the "life event" prediction component of the method of the invention.

FIGS. 10 and 11 depict how the individual life prediction components create features that are used in the churn prediction component in the current invention.

Specifically, each life prediction component is built in a multi-step process:
1. Collect relevant social media content for a specific life event. For example, for new job life event component collect a large data set of relevant tweets, FACEBOOK posts, GOOGLE+ posts, etc. and store them in a database repository.
2. Collect randomized social content and store them in a database repository.
3. Use a manual curation tool to have multiple human subjects review each of the social contents collected for a life event and annotate that content either as positive (indicating the content implies the corresponding life event will occur) or negative (indicating the content implies the corresponding life event will not occur)
4. Update the curated social content collection in a database repository.
5. Using the curated social content to build and train a predictor model (for example, using a machine learning trainer component).
6. Serializing and storing the predictor model for future predictions.

"Cloud computing" services provide shared resources, software, and information to computers and other devices upon request. In cloud computing environments, software can be accessible over the Internet rather than installed locally on in-house computer systems. Cloud computing typically involves over-the-Internet provision of dynamically scalable and often virtualized resources. The database resources aggregated and collected and arranged within the scope of the invention may be stored and provided in a cloud computing context.

It is to be understood that the implementation of the method of the invention may be via CRM or via the exchange and conveyance of data and information via an API to the company/client.

So, in one embodiment of the invention, an churn prediction platform integrates a contact center, agent stations, and, optionally, a customer relation management (CRM) server. Typically, the contact center, the agent station(s), and the customer relation management server are coupled over one or more networks, which may be the Internet, a private network, or a telephone network. The customer relation management server may be physically located within the contact center and maintained by a third party, or located remote from the contact center and still operated thereby. The elements of this agent state model are dynamic and updated in real-time as an agent (delivering a service) seeks to acquire information in regards to the likelihood of a customer of that service "churning".

In this type of embodiment, the system of the invention implements a web-based customer relationship management (CRM) system. For example, in one embodiment, the system includes application servers configured to implement and execute CRM software applications as well as provide related data, code, forms, webpages and other information and retrieve from, a database system related data and content, related to the delivery of the method of the invention.

Alternatively, the implementation of the method of the invention may be via an application programming interface (API). Application Programming Interface ("API") can accept the directives from, for example, an admin console. API can be a standards-compliant Internet protocol following Simple Object Access Protocol ("SOAP") or Representational State Transfer ("REST") patterns. Alternatively, API can be a body of industry standard or proprietary Remote Procedure Call ("RPC") technologies.

An API may use a directive dispatcher to dispatch device-neutral directives to one or more directive processors. Directive processors can be included for any number of features. An API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

APIs often come in the form of a library that includes specifications for routines, data structures, object classes, and variables. In other cases, notably SOAP and REST services, an API is simply a specification of remote calls exposed to the API consumers.

By way of example, an admin user of a computer architecture within the scope of the invention can utilize administrator console software program to implement the method of the invention. Such a software program can be a Web browser application, software installed on a computer system, or an application ("app") installed on a tablet or smart phone. The admin user can supply "directives" to via an admin console. "Directives" can be commands, scripts, software packages, configuration manifests, configuration policies, software licensing keys, workflows, user and hardware catalogs, and other such inputs that the admin desires to implement over a population of devices and external systems.

We claim:

1. A computer implemented method of collecting/mining data relating to social media influence around multiple customers of a company providing a subscription or a service, and analyzing said data to predict a customer's predisposition to reduce his/her engagement with the subscription or a service, the multiple customers being members of an identified community of members, the method comprising: a) receiving in real time with a processing device a plurality of social media inputs associated with the multiple customers from multiple sources across a network; b) identifying from the social media inputs with the one or more processing devices one or more influencing entities of the multiple customers in communication with the multiple customers over the multiple sources; c) determining with the one or more processing devices a churn probability for each of the multiple customers based on a ratio of the number of members using a subscription or service of the company to the total number of members of the community and at least one communication between the multiple customers and the influencing entity; and d) performing an action with the one or more processing devices based on the determined churn probability.

2. A computer-implemented method to characterise social influence and to predict behavior of multiple users of a company providing a subscription or a service, the multiple users being members of an identified community of members, said multiple users being part of a social network, the method comprising: a) creating with processing device a first dynamically updatable social influence profile of the multiple users based on data collected in real time from multiple sources across a network, b) creating with the one or more processing devices a second dynamically updatable social influence profile of one or more influencing entities of the multiple users in communication with the multiple users over the social network; c) predicting with the one or more processing devices future behavior of the multiple users based on the first and second profiles, and thereafter d) predicting with the one or more processing devices and based on a ratio of the number of members using a subscription or service of the company to the total number of members of the community each of the multiple users predisposition to either leave a subscription or a service or reduce his/her engagement with a subscription or a service.

3. A computer implemented method of collecting/mining data from multiple sources across a network relating to social media influence around multiple customers of a company providing a subscription or a service, and analyzing said data to predict a customer's predisposition to either leave a subscription or a service or reduce his/her engagement with a subscription or a service, the multiple customers being members of an identified community of members, the method comprising: a) identifying with a processing device a social media profile of the b) comparing with the one or more processing devices customer and his social media profile to clusters of customers, based upon similar social media profiles ("cohorts"); and c) calculating in real time with the processing device predicted churn behavior of the multiple customers, based upon a ratio of the number of members using a subscription or service of the company to the total number of members of the community, known churn behavior of cohorts and a communication between the and at least one of the cohorts.

4. The method of claim 3 wherein cohorts are identified by a) extracting a plurality of feature vectors of customer; and b) computing cohorts from the feature vectors.

5. The method of claim 4 wherein feature vectors are social network inputs, cues and influences.

6. A non-transitory computer readable medium on which are stored instructions that when executed by a processing device provide a system, comprising: an information module that is configured to identify with processing device multiple users of a company providing a service, the multiple users being members of an identified community of members; a probability module that is configured to determine based on data received from multiple sources across the network with the processing device, churn probabilities for the multiple users of the service; and an action module that is configured to perform an action with the processing device based on the determined churn probability, wherein the probability module includes a churn calculator that is configured to analyze one or more behaviors associated with the multiple users within a plurality of social networks and platforms (social media profile of the multiple users), to compare the users and their social media profiles to clusters of other users, based upon similar social media profiles ("cohorts"); and to calculate with the one or more processing devices predicted churn behavior of each of the multiple users, based upon a ratio of the number of members using a subscription or service of the company to the total number of members of the community, known churn behavior of cohorts and a communication between the multiple users and at least one of the cohorts.

7. A computer-implementable method for predicting and delivery of churn signals for multiple customers of a company providing a subscription or a service that are at risk of terminating their subscription and/or service to the customer retention units at the provider company, the customers being members of an identified community of members, wherein the churn predictions are generated based on a ratio of the number of members using a subscription or service of the company to the total number of members of the community and by real time analysis of full social media profiles of customers, the method comprising generating with one or more processing devices churn predictions by analyzing in real time full social media profiles of customers based on multiple data sources across a network and at least one communication between each of the customers.

8. The method of claim 7 wherein customer loyal/disloyal characteristics towards services and subscriptions are used in the churn prediction.

9. The method of claim 7 wherein customer engagement with rival companies plays a factor in the prediction of churn signals.

10. The method of claim 7 wherein the influence of social networks on customers is incorporated in the prediction of churn signals.

11. The method of claim 7 wherein churn signals are utilized to prevent customers from canceling their contracts and/or subscriptions.

12. The method of claim 7 wherein a social media profile for a customer is comprised of all of their historical posts, blogs, status updated, communications, and general publicly available material on their social media accounts from the group consisting of, but not limited to, TWITTER, FACEBOOK, LINKEDIN, INSTAGRAM, WORDPRESS, and GOOGLE+.

13. The method of claim 7 wherein a social media profile may include private material on their social media accounts that is available to the social media accounts of the companies they have subscribed to.

14. The method of claim 7 wherein life events are utilized in the prediction of churn signals.

15. A non-transitory, tangible computer-readable medium storing instructions adapted to be executed by a computer processor to perform a method for generating a customer churn prediction for multiple customers of a company, the multiple customers being members of an identified community of members, for an entity in need of such prediction, said method comprising the steps of:

extracting and receiving in real time, by a churn prediction program executing on processing device, a variety of social media inputs from multiple sources across a network; preprocessing with the processing device the social media inputs to identify relevant social media posts, data trends and social network structures (pre-processed data); extracting and engineering with the processing device features of the pre-processed data, such features comprising at least one of i) assessed social media postings, ii) assessed life events, iii) assessed engagement with the entity and competitors of said entity iv) assessed trend predisposition of customers to the entity based upon their prior churns, v) assessed one or more communities of customers to the entity and predisposition of the customers to the entity to churn based upon churn risk of the one or more communities; create feature vectors with the one or more processing devices based at least upon i) to v); aggregating feature vectors with the processing device into a database and creating churn model in the processor (churn model of aggregated features); determining, by the churn prediction program executing on the one or more processing devices, predicted churn behavior of any one customer to the entity based upon a ratio of the number of members using a subscription or service of the company to the total number of members of the community, the comparison of at least one feature vector of the any one customer to the churn model of aggregated features and a communication between one or more customers.

\* \* \* \* \*